United States Patent
Tripathi

(10) Patent No.: US 10,284,431 B2
(45) Date of Patent: *May 7, 2019

(54) DISTRIBUTED OPERATING SYSTEM FOR NETWORK DEVICES

(71) Applicant: Pluribus Networks, Inc., Palo Alto, CA (US)

(72) Inventor: Sunay Tripathi, Palo Alto, CA (US)

(73) Assignee: Pluribus Networks, Inc., San Jose, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/132,201

(22) Filed: Apr. 18, 2016

(65) Prior Publication Data

US 2016/0277254 A1 Sep. 22, 2016

Related U.S. Application Data

(63) Continuation of application No. 13/313,837, filed on Dec. 7, 2011, now Pat. No. 9,319,335.

(Continued)

(51) Int. Cl.
*H04L 12/24* (2006.01)
*H04L 12/801* (2013.01)
(Continued)

(52) U.S. Cl.
CPC .......... *H04L 41/12* (2013.01); *H04L 12/4641* (2013.01); *H04L 12/6418* (2013.01);
(Continued)

(58) Field of Classification Search
CPC ..... H04L 41/12; H04L 47/35; H04L 12/4641; H04L 12/6418; H04L 45/02; H04L 47/196; H04L 49/25; H04L 61/6022; H04L 45/66

See application file for complete search history.

(56) References Cited

U.S. PATENT DOCUMENTS 6,647,004 B2 * 11/2003 Allen, Jr. .............. H04L 45/742
370/335
6,718,379 B1 * 4/2004 Krishna .............. H04L 41/5022
709/220

(Continued)

*Primary Examiner* — Andrew Lai
*Assistant Examiner* — Hoyet H Andrews, III
(74) *Attorney, Agent, or Firm* — Penilla IP, APC

(57) ABSTRACT

Methods, systems, and computer programs are presented for managing a global network topology. One method includes an operation for generating, by a network device, a local topology identifying which network entities are connected to each external port of the network device. The network device is configured to execute a network device operation system (ndOS), and the network device is configured to share information associated with the local topology with other ndOS network devices that execute ndOS. Further, the method includes an operation for receiving one or more remote local topologies from respective one or more ndOS network devices. The network device generates a global topology based on the local topology and the one or more remote local topologies, where the global topology is shared by the network device and the ndOS network devices executing ndOS, and the global topology identifies which entities are connected to one or more of the ndOS network devices.

17 Claims, 17 Drawing Sheets

Related U.S. Application Data

(60) Provisional application No. 61/420,526, filed on Dec. 7, 2010.

(51) Int. Cl.
*H04L 12/46* (2006.01)
*H04L 12/64* (2006.01)
*H04L 12/751* (2013.01)
*H04L 12/947* (2013.01)
*H04L 29/12* (2006.01)
*H04L 12/721* (2013.01)

(52) U.S. Cl.
CPC ............ *H04L 45/02* (2013.01); *H04L 47/196* (2013.01); *H04L 47/35* (2013.01); *H04L 49/25* (2013.01); *H04L 61/6022* (2013.01); *H04L 45/66* (2013.01)

(56) References Cited

U.S. PATENT DOCUMENTS

| | | | | |
|---|---|---|---|---|
| 6,842,443 B2 * | 1/2005 | Allen, Jr. | ............... | H04L 45/742 370/335 |
| 6,985,431 B1 * | 1/2006 | Bass | ................... | G06F 13/4022 370/235 |
| 7,257,616 B2 * | 8/2007 | Bass | ................... | G06F 13/4022 370/251 |
| 7,590,057 B2 * | 9/2009 | Bass | ................... | G06F 13/4022 370/229 |
| 7,620,048 B2 * | 11/2009 | Bass | ................... | G06F 13/4022 370/392 |
| 7,962,647 B2 * | 6/2011 | Suri | ....................... | H04L 45/00 709/224 |
| 8,578,076 B2 * | 11/2013 | van der Linden | .... | G06F 9/5077 710/72 |
| 8,811,153 B1 * | 8/2014 | Yang | ................... | H04L 49/1523 370/218 |
| 8,861,401 B2 * | 10/2014 | Anantharam | ......... | H04L 45/745 370/254 |
| 2005/0232205 A1 * | 10/2005 | Bass | ................... | G06F 13/4022 370/335 |
| 2006/0101159 A1 * | 5/2006 | Yeh | ......................... | H04L 45/00 709/246 |
| 2009/0034426 A1 * | 2/2009 | Luft | .................... | H04L 41/5009 370/252 |
| 2009/0150883 A1 * | 6/2009 | Tripathi | .............. | G06F 9/45558 718/1 |
| 2010/0325257 A1 * | 12/2010 | Goel | ................. | H04L 29/12028 709/223 |

\* cited by examiner

DISTRIBUTED OPERATING SYSTEM FOR NETWORK DEVICES

CLAIM OF PRIORITY

This application is a Continuation Application under 35 USC § 120 of U.S. patent application Ser. No. 13/313,837, entitled "Distributed Operating System for a Layer 2 Fabric," filed Dec. 7, 2011, which claims priority from U.S. Provisional Patent Application No. 61/420,526, filed Dec. 7, 2010, and entitled "Distributed Operating System for a Layer 2 Fabric, all of which are incorporated herein by reference.

BACKGROUND

Network devices transmit data within or between networks. Network devices such as switches and routers have limited functionality to monitor the flow of packets in a network. As a result of this limited functionality, switches and routers have a limited ability to control and manage the flow of packets through a network.

SUMMARY

In general, in one aspect, the invention relates to a network device, including a switch fabric including a switch fabric classifier, a plurality of external ports and a plurality of internal ports, a control processor configured to execute a network device operation system (ndOS), and a switch operatively connected to the switch fabric and the control processor, where the network device is connected to at least one host using at least one of the plurality of external ports, where the ndOS is configured to send a classification rule to the switch fabric classifier using the switch, where the ndOS is configured to receive packets from the switch fabric over the switch, and where the ndOS is configured to send packets directly to the switch fabric using a first one of the plurality of internal ports.

In general, in one aspect, the invention relates to a system including a layer 2 fabric including a first network device and a second network device, where the first network device is directly connected to the second network device, a first host connected to the first network device, and a second host connected to the second network device, where the first network device includes a first network device operating system (ndOS) and the second network device including a second ndOS, where the first ndOS is configured to receive a request from the first host, sending the request to the second ndOS, where the second ndOS processes the request.

In general, in one aspect, the invention relates to a system, including a layer 2 fabric including a first network device and a second network device, a first host including a first virtual machine (VM) connected to the first network device, and a second host including a second VM connected to the second network device, where the layer 2 fabric includes a first virtual network including the first VM and the second VM, where the first virtual network is specified using at least one selected from a group consisting of a MAC address, a VLAN tag, a VLAN Q-in-Q tag, and an Multiprotocol Label Switching (MPLS) labels, where the first virtual network is managed by a virtual network manager executing on the first network device.

Other aspects of the invention will be apparent from the following description and the appended claims.

BRIEF DESCRIPTION OF THE DRAWINGS

The embodiments may best be understood by reference to the following description taken in conjunction with the accompanying drawings.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention are directed to a layer 2 fabric that includes network devices. More specifically, embodiments of the invention relate to generating a layer 2 fabric and then processing requests using the operating systems (ndOSes) on the network devices that make up the layer 2 fabric. In one embodiment of the invention, the ndOSes collectively form a distributed operating system that operates across the entire layer 2 fabric. The distributed operating system enables fine grained control of the entire layer 2 fabric.

Further, embodiments of the invention are directed to a network device in a layer 2 fabric that includes functionality to process packets in accordance with layer 2 protocols (where layer 2 is defined in accordance with the OSI model). Further, embodiments of the invention relate to a network device that includes a control processor executing a network device operating system (ndOS) that is configured to manage the network device including setting the classification rules in the switch fabric classifier and generating layer 2 topologies based upon the receipt of discovery packets.

Figure 1:
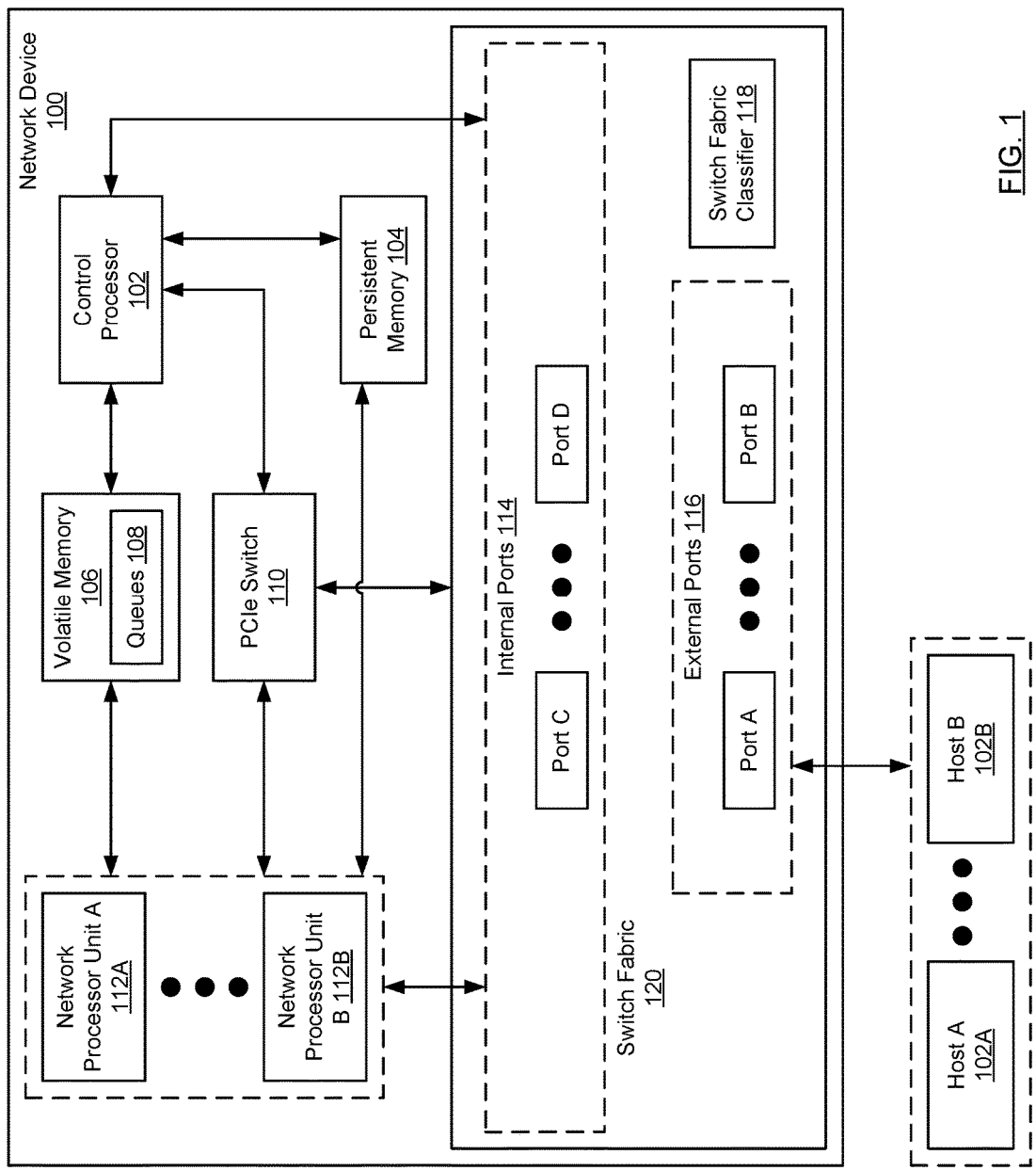
FIG. 1 shows a network device in accordance with one or more embodiments of the invention.

FIG. 1 shows a network device in accordance with one or more embodiments of the invention. In one or more embodiments of the invention, the network device (100) includes external ports (116), internal ports (114), a switch fabric classifier (118), one or more network processing units (NPUs) (112A, 112B), a control processor (102), persistent memory (104), a PCIe Switch (110), switch fabric (120) and volatile memory (106). Each of these components is described below.

In one embodiment of the invention, a network device (100) is any physical device in a network that includes functionality to receive packets from one network entity and send packets to another network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device (also referred to as hosts, see, e.g., 102A, 102B), virtual network appliances (e.g., virtual switch, virtual router), and physical network appliances (e.g., firewall appliance).

The network device (100) (or components therein) may be implemented using any combination of hardware, firmware, and/or software. With respect to the hardware, the network device may be implemented using any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof.

In one embodiment of the invention, the switch fabric (120) includes one or more internal ports (114), one or more external ports (116), and the switch fabric classifier (118). In one embodiment of the invention, the switch fabric classifier (118) may be implemented using an on-chip or off-chip Ternary Content Addressable Memory (TCAM) or other similar components. In one embodiment of the invention, the internal and external ports correspond to virtual or physical connection points. In one embodiment of the invention, the switch fabric may be implemented using packet switching, circuit switching, another type of switching, or any combination thereof. The external ports (116) are configured to receive packets from one or more hosts (102A, 102B) and to send packets to one or more hosts (102A, 102B). While FIG. 1 shows the external ports connected only to hosts (102A, 102B), the external ports (116) may be used to send and receive packets from any network entity (as described above).

In one embodiment of the invention, the internal ports (114) are configured to receive packets from the switch fabric (114) and to send the packets to the control processor (102) (or more specifically, the ndOS executing on the control processor) and/or to an NPU (112A, 112B). Further, the internal ports are configured to receive packets from the control processor (102) (or more specifically, the ndOS executing on the control processor) and/or the NPU (112A, 112B).

In one embodiment of the invention, the control processor (102) is any processor configured to execute the binary for the ndOS. In one embodiment of the invention, the NPU is a specialized processor that includes functionality to processes packets. In one embodiment of the invention, the NPU may be implemented as any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. In one embodiment of the invention, the network device (100) may also include Field Programmable Gate Arrays (FPGAs) and/or Application Specific Integrated Circuits (ASICs) that are specifically programmed to process packets. In one embodiment of the invention, the network device may include FPGAs and/or ASICs instead of NPUs. In one embodiment of the invention, processing packets includes: (i) processing the packets in accordance with layer 2, layer 3 and/or layer 4 protocols (where all layers are defined in accordance with the OSI model), (ii) making a copy of the packet, (iii) analyzing (including decrypting and/or encrypting) the content of the header and/or payload in the packet, and/or (iv) modifying (including adding or removing) at least a portion of the header and/or payload in the packet.

In one embodiment of the invention, the switch fabric (120) is configured to: (i) send packets received from the internal ports (114) to the appropriate external ports (116) and (ii) send packets received from the external ports (116) to the appropriate internal ports (114).

In one embodiment of the invention, the switch fabric classifier (118) is configured to apply a classification rule to each packet received by the switch fabric to determine: (i) whether to send the received packet to an external port, (ii) whether to send the received packet to an internal port, and/or (iii) whether to send the received packet to the PCIe switch (110).

In one embodiment of the invention, the classification rule includes a classification criteria and an action. In one embodiment of the invention, the classification criteria specifies a media access control (MAC) address, an Internet Protocol (IP) address, a Transmission Control Protocol (TCP), user datagram protocol (UDP), an OSI layer 4 information related to a TCP ports, an IPSec security association (SA), a virtual local area network (VLAN) tag, a 802.1Q VLAN tag, or a 802.1Q-in-Q VLAN tag, or any combination thereof. In one embodiment of the invention, the action corresponds to an action to be performed when a packet satisfying the classification rule is identified. Examples of actions include, but are not limited to, (i) forward packet to the control processor (via a specific internal port or the PCIe switch), (ii) forward packet to an NPU (via a specific internal port or the PCIe switch), and (iii) send a copy of the packet to a specific external port.

In one embodiment of the invention, the switch fabric (120) is configured to communicate with the control processor (102) and/or the NPUs (112A, 112B) using a Peripheral Component Interconnect Express (PCIe). Those skilled in the art will appreciate the other hardware based switching frameworks/mechanisms may be used in place of (or in addition to) PCIe.

In one embodiment of the invention, the persistent memory (104) is configured to store the binary for the ndOS. The persistent memory (104) may be implemented using any non-transitory storage mechanism, e.g., magnetic storage, optical storage, solid state memory, etc.

In one embodiment of the invention, the volatile memory (106) is configured to temporarily store packets in one or more queues (108). The volatile memory may be implemented using any non-persistent memory, e.g., RAM, DRAM, etc. In one embodiment of the invention, each of the queues is configured to only store packets for a specific flow. In one embodiment of the invention, a flow corresponds to a group of packets that all satisfy a given classification rule.

Figure 2:
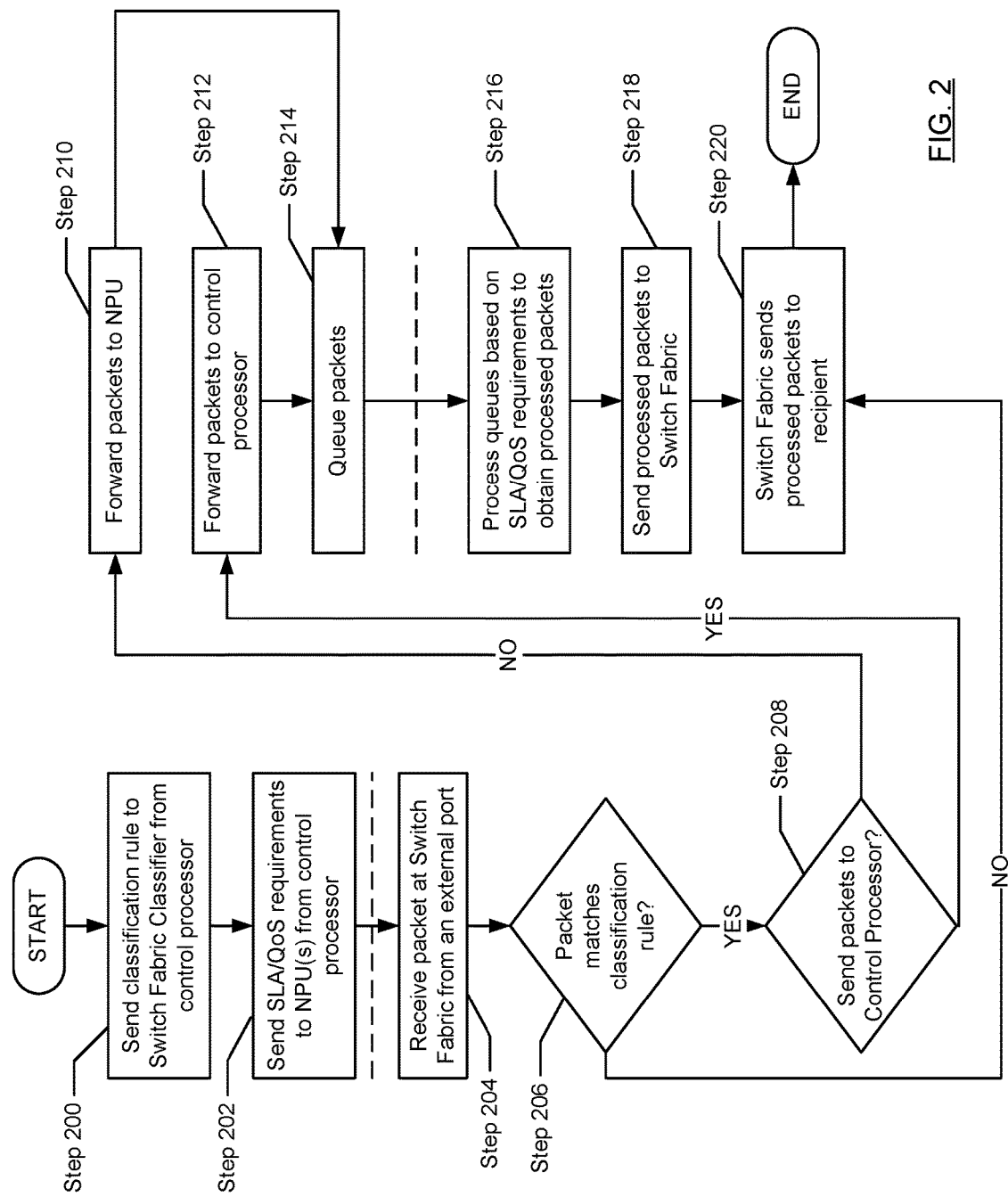
FIG. 2 shows a flowchart in accordance with one or more embodiments of the invention.

FIG. 2 is a flowchart in accordance with one or more embodiments of the invention. More specifically, FIG. 2 shows a method for processing packets received by the network device in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 200, the control processor (or, more specifically, the ndOS executing on the control processor) sends a classification rule to the switch fabric classifier. In one embodiment of the invention, the classification rule is communicated to the switch fabric classifier via the PCIe switch or via one of the internal ports. Upon receipt of the classification rule, the switch fabric classifier performs the necessary actions to implement the classification rule.

In Step 202, the control processor (or, more specifically, the ndOS executing on the control processor) sends SLA/QoS requirements to the switch fabric and/or NPU(s). In one embodiment of the invention, the SLA/QoS requirements may include, but are not limited to, a latency guarantee (i.e., the maximum latency for any given packet), a bandwidth limit, and a bandwidth guarantee. In one embodiment of the invention, the SLA/QoS requirements may be implemented using one or more Access Control Lists (ACL) (discussed below). In one embodiment of the invention, the ACL are enforced by the switch fabric classifier, the control processor, and the NPU(s). In one embodiment of the invention, the ACL may be enforced on the switch fabric using one or more classification rules.

In Step 204, at some later point in time (after Steps 200, and 202), a packet may be received by the Switch Fabric from an external port. In Step 206, a determination is made by the Switch Fabric Controller about whether the packet matches a classification rule. If the packet does not match a classification rule, then process proceeds to Step 220; otherwise the process proceeds to Step 208. In Step 208, a determination is made about whether the packet is to be forwarded to the control processor. In one embodiment of the invention, this determination is made based one the action (as described above) that is associated with the classification rule. If the packet is to be forwarded to the control processor the process proceeds to Step 212; otherwise, the process proceeds to Step 210.

In Step 210, the packet is forwarded to the NPU. In Step 212, the packet is forwarded to the control processor. In Step 214, the control processor (if the prior step was Step 212) or the NPU (if the prior step was 210) forwards the packet to the appropriate queue in the volatile memory. In one embodiment of the invention, the volatile memory may be shared by the control processor and the NPU(s) or there may separate virtual memory dedicated to the control processor and the NPU(s). In Step 216, the control processor or NPU (depending whether the control processor or NPU is handling the processing of the packets in a given flow) processes the packets in accordance with a priority set by the SLA/QoS requirements. For example, flows that have higher SLA/QoS requirements (e.g., packets that need to be processed with a relatively low latency) are prioritized over packets with lower SLA/QoS requirements (e.g., packets that need to be processed with a relatively high latency). In one embodiment of the invention, the control processor or the NPU (as appropriate) ensures that the SLA/QoS requirements for all the queued packets are satisfied in accordance with their SLA/QoS requirements.

In Step 218, once the processing is complete, the process packets (which may be identical to the non-processed packets) are sent (via the internal ports or the PCIe Switch) to the switch fabric. In Step 220, the packet is forwarded, using a switch table, to an appropriate external port in the network device. In one embodiment of the invention, the switch table includes a mapping between external ports and MAC addresses. Accordingly, the switch fabric obtains the destination MAC address from the packet, uses the destination MAC address and switch table to identify the external port over which to transmit the packet. Once the external port is identified, the packet is transmitted over the external port. In one embodiment of the invention, the switch fabric may also include volatile memory (internal or external) which may be used to enforce QoS/SLAs.

Those skilled in the art will appreciate that for a given flow, steps 200 and 202 need to be performed prior to steps 204-214. Further, for a given flow, steps 204-214 may be performed in parallel with steps 216-220. For example, packets for a given flow may be processed in steps 216-220 while additional packets for the flow are being received and stored pursuant to steps 204-214. In addition, those skilled in the art will appreciate that for any given queued packet, there may be a delay between the queuing of the packet and the subsequent processing of the packet.

Figure 3:
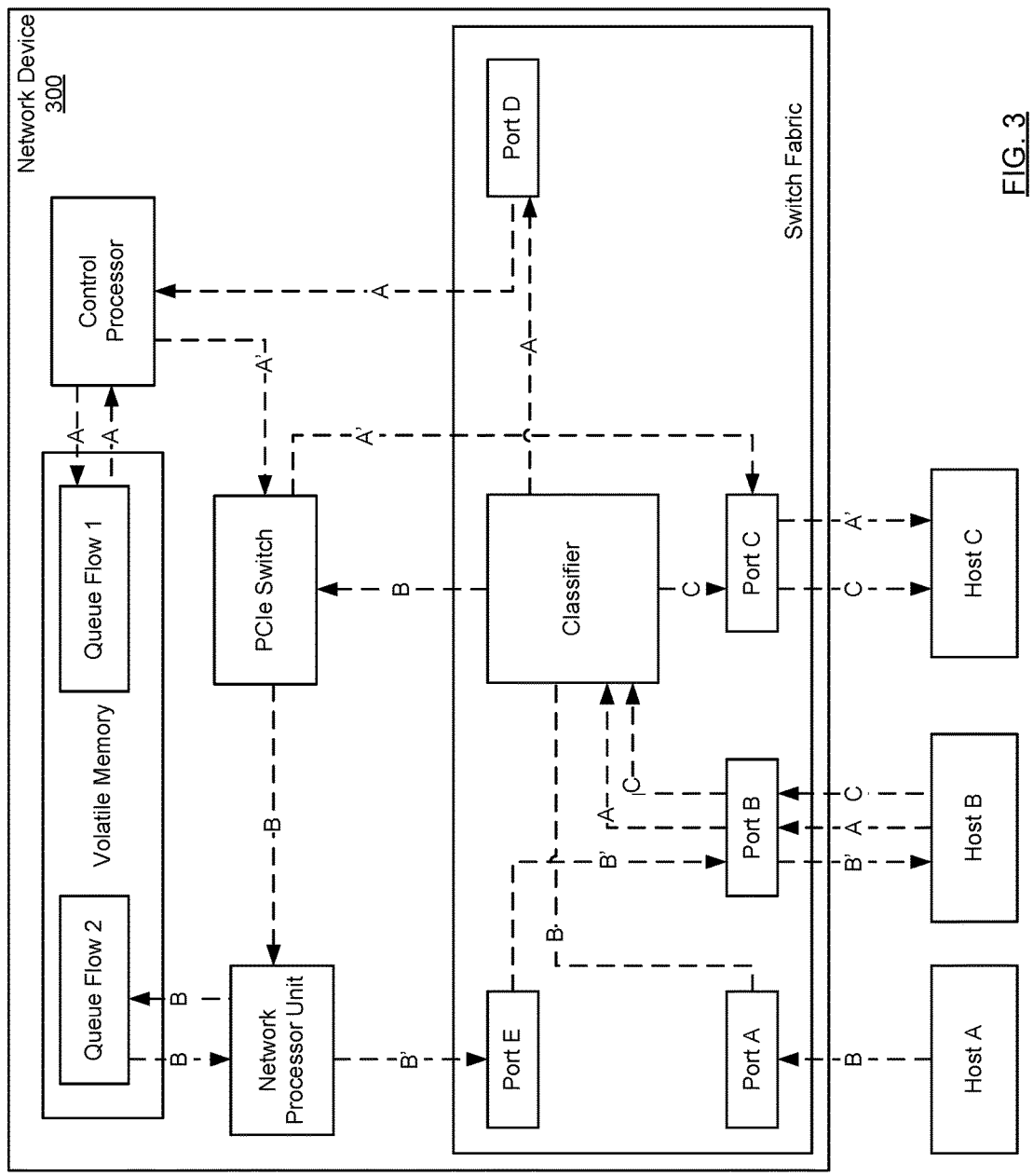
FIG. 3 shows an example in accordance with one or more embodiments of the invention.

FIG. 3 shows an example in accordance with one or more embodiments of the invention. More specifically, FIG. 3 shows an example of how packets are processed in accordance with the method shown in the flowchart in FIG. 3. This example is not intended to limit the scope of the invention.

Turning to the example, consider the scenario in which the network device (300) includes three external ports (Port A, Port B, and Port C) and two internal ports (Port D and Port E). Further, the control processor is configured to send and receive packets from Port D and the Network Processor Unit (NPU) is configured to send and receive packets from Port E.

In a first example, host B sends packet A to the network device (300). Packet A is received by Port B and subsequently forwarded to the switch fabric classifier. The switch fabric classifier determines that Packet A matches a first classification rule, which specifies that the packet is to be sent to the control processor via Port D. The switch classifier subsequently forwards Packet A to Port D. Upon receipt by Port D, the packet is forwarded to the control processor. The control processor, upon receipt of Packet A, queues packet A in Queue Flow 1 (i.e., a queue for flow 1) in the volatile memory. At some later point in time and based on the SLA/QoS requirements, Packet A is retrieved from Queue Flow 1 and processed by the control processor to obtain Packet A'. After processing, process packet A (denoted as Packet A', which may be identical to Packet A) is transmitted back to the switch fabric via the PCIe Switch. Upon receipt, Packet A' is sent to external port C (using a switch table—not shown).

In a second example, host A sends packet B to the network device (300). Packet B is received by Port A and subsequently forwarded to the switch fabric classifier. The switch fabric classifier determines that Packet B matches a second classification rule, which specifies that the packet is to be sent to the NPU via the PCIe Switch. The switch classifier subsequently forwards Packet B the NPU via the PCIe Switch.

The NPU, upon receipt of Packet B, queues packet B in Queue Flow 2 (i.e., a queue for flow 2) in the volatile memory. At some later point in time and based on the SLA/QoS requirements, Packet B is retrieved from Queue Flow 2 and processed (as described above) by the control processor to obtain Packet B'. After processing, processed packet B (denoted as Packet B', which may be identical to Packet B) is transmitted back to the switch fabric via Port E. Upon receipt, Packet B' is sent to external port B (using a switch table—not shown).

In a third example, host B sends packet C to the network device (300). Packet C is received by Port B and subsequently forwarded to the switch fabric classifier. The switch fabric classifier determines that Packet C does not match any classification rules and, accordingly, is forwarded to Port C (based on the switch table—not shown). Upon receipt by Port C, Packet C is transmitted to Host C.

Figure 4A:
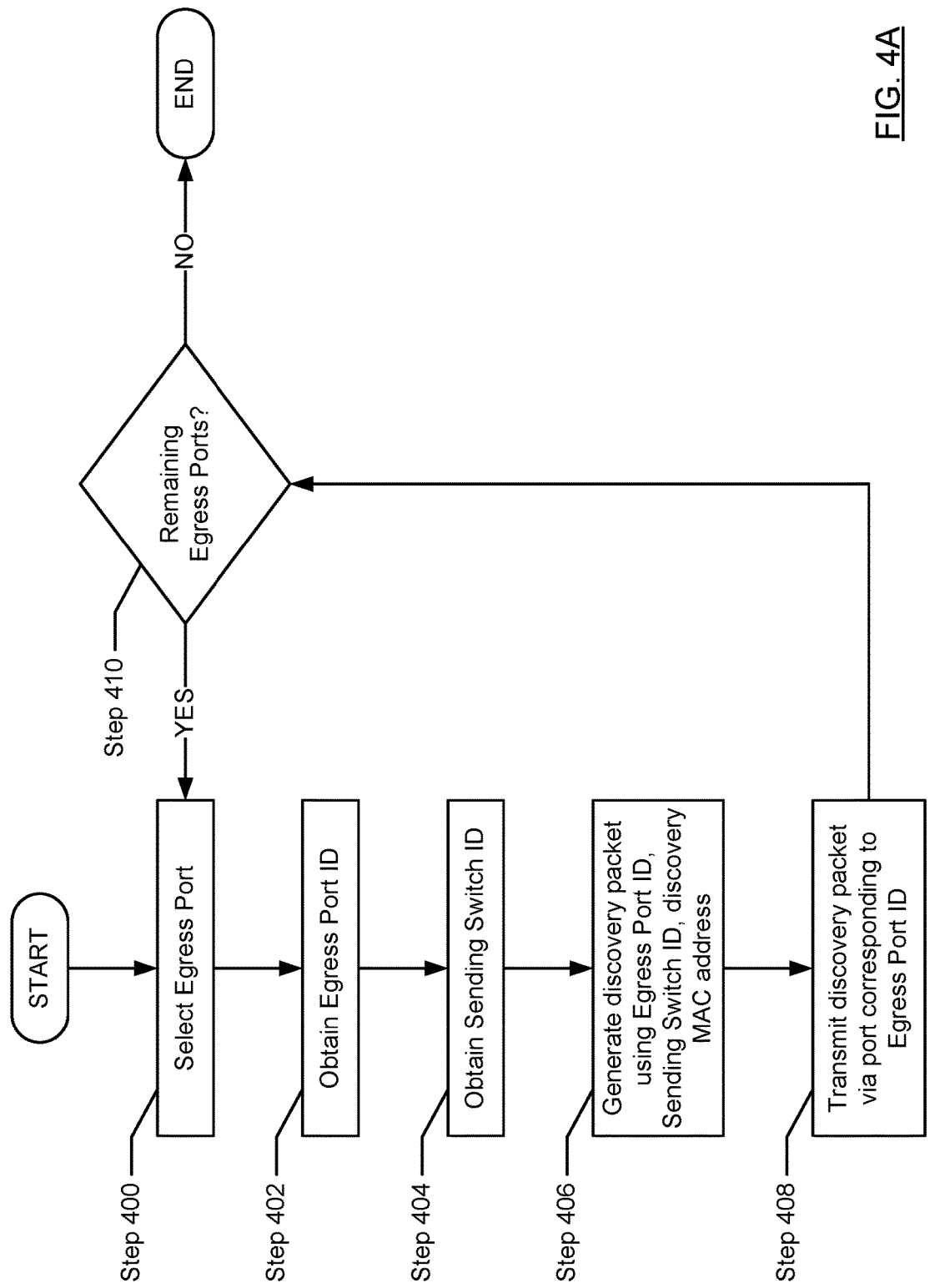
FIGS. 4A-4B show flowcharts in accordance with one or more embodiments of the invention.
Figure 4B:
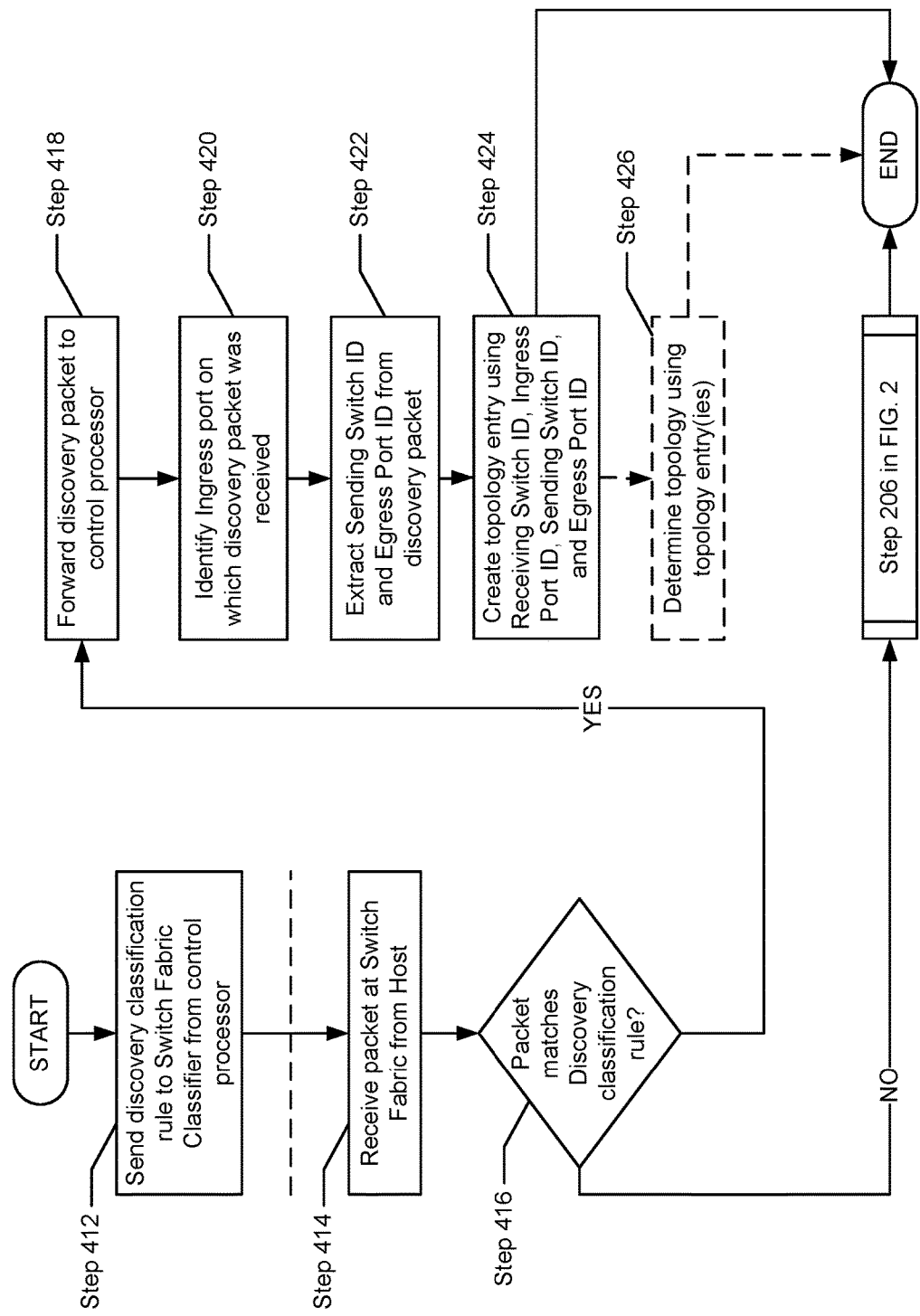

FIGS. 4A-4B show flowcharts in accordance with one or more embodiments of the invention. More specifically, FIGS. 4A-4B show a method for determining a layer 2 topology in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel.

FIG. 4A shows a flowchart for generating and sending discovery packets in accordance with one or more embodiments of the invention. Referring to FIG. 4A, in Step 400, an egress port (also referred to as an external port) on the network device is selected. In Step 402, the Egress Port ID corresponding to the egress port selected in step 400 is obtained. The Egress Port ID uniquely identifies the egress port on the network device. In Step 404, the sending switch ID is obtained. The sending switch ID uniquely identifies the network device. In Step 406, a discovery packet is generated using the Egress Port ID, the Sending Switch ID, and a discovery MAC address. In one embodiment of the invention, the discovery MAC address corresponds to a particular MAC address that the network device (and other network devices on the network) uses to indicate that a given packet is a discovery packet. In one embodiment of the invention, the discovery MAC address is part of the discovery packet header while the Egress Port ID and the Sending Switch ID are part of the discovery packet payload. In Step 408, the discovery packet is transmitted to the network via the external port identified by the Egress Port ID. In Step 410, a determination is made about whether there are any additional egress ports in the network device over which to transmit discovery packets. If so, the process proceeds to Step 400; alternatively, the process ends. In one embodiment of the invention, the method shown in FIG. 4A is used to generate discovery packets for each of the external ports on a network device (or for each external port that is not connected to a host (or other equivalent network entity)).

FIG. 4B shows a flowchart for processing discovery packets to generate a Layer 2 topology for the network in accordance with one or more embodiments of the invention. Referring to FIG. 4B, in Step 412, the control processor (or, more specifically, the ndOS executing on the control processor) sends a discovery classification rule to the switch fabric classifier. In one embodiment of the invention, the discovery classification rule is communicated to the switch fabric classifier via the PCIe switch. The discovery classification rule specifies the discovery MAC address (and/or any other identifying header field(s)). Upon receipt of the discovery classification rule, the switch fabric classifier performs the necessary actions to implement the discovery classification rule.

In Step 414, at some later point in time (after step 412), a packet may be received by the Switch Fabric from an external port. In Step 416, a determination is made by the Switch Fabric Controller about whether the packet matches the discovery classification rule. If the packet does not match the discovery classification rule, then process proceeds to Step 206 in FIG. 2; otherwise the process proceeds to Step 418.

In Step 418, the packet (which has been identified as a discovery packet) is forwarded to the control processor. In Step 420, the control processor (or more specifically, the ndOS (or a process therein)) identifies (directly or indirectly) the Ingress Port (i.e., an external port) on which the particular discovery packet was received.

In Step 422, the control processor (or more specifically, the ndOS (or a process therein)) extracts the Sending Switch ID and the Egress Port ID from the discovery packet. In Step 424, the control processor (or more specifically, the ndOS (or a process therein)) creates a topology entry that includes (i) the Receiving Switch ID, which uniquely identifies the network device that received the discovery packet, (ii) the Ingress Port ID, which uniquely identifies the external port of the network device through which the discovery packet was received, (iii) the Sending Switch ID, and (iv) the Egress Port ID of the sending switch.

In Step 426, the network device generates a layer 2 topology using one or more topology entries. In one embodiment of the invention, the topology entries may be used to generate local layer 2 topologies, which specifies which network entities (including virtual machines and physical hosts) (if any) are connected to each of the external ports on the network device. The individual network devices may then communicate their local layer 2 topology to any other network devices to which they are (directly or indirectly) connected. In this manner, each of the network devices may receive local layer 2 topologies and, using the local layer 2 topologies, generate a global layer 2 topology. In this manner, a given network device may not only be aware of the network entities to which it is directly connected, but also may be aware of network entities to which other network devices are connected.

In one embodiment of the invention, a first network device may receive a local layer 2 topology from a second network device and, using the received local layer 2 topology update its local layer 2 topology to include the received local layer 2 topology. The first network device may subsequently send the updated local layer 2 topology to a third network device. In this manner, the third network device may receive a single local layer 2 topology from the first network device instead of two separate layer 2 topologies (i.e., one from the first network device and one from the second network device). In this manner, the bandwidth used to transmit the local layer 2 topologies may be decreased.

Those skilled in the art will appreciate that for a given flow, step 400 needs to be performed prior to steps 414-426. Further, steps 414-424 may be performed multiple times prior to performing step 426.

Figure 5A:
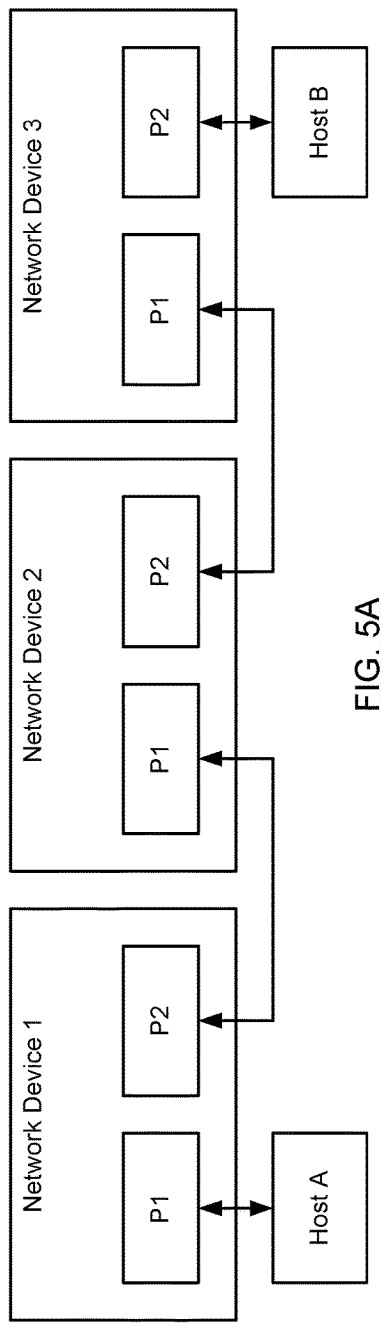
FIGS. 5A-5C show examples in accordance with one or more embodiments of the invention.
Figure 5B:
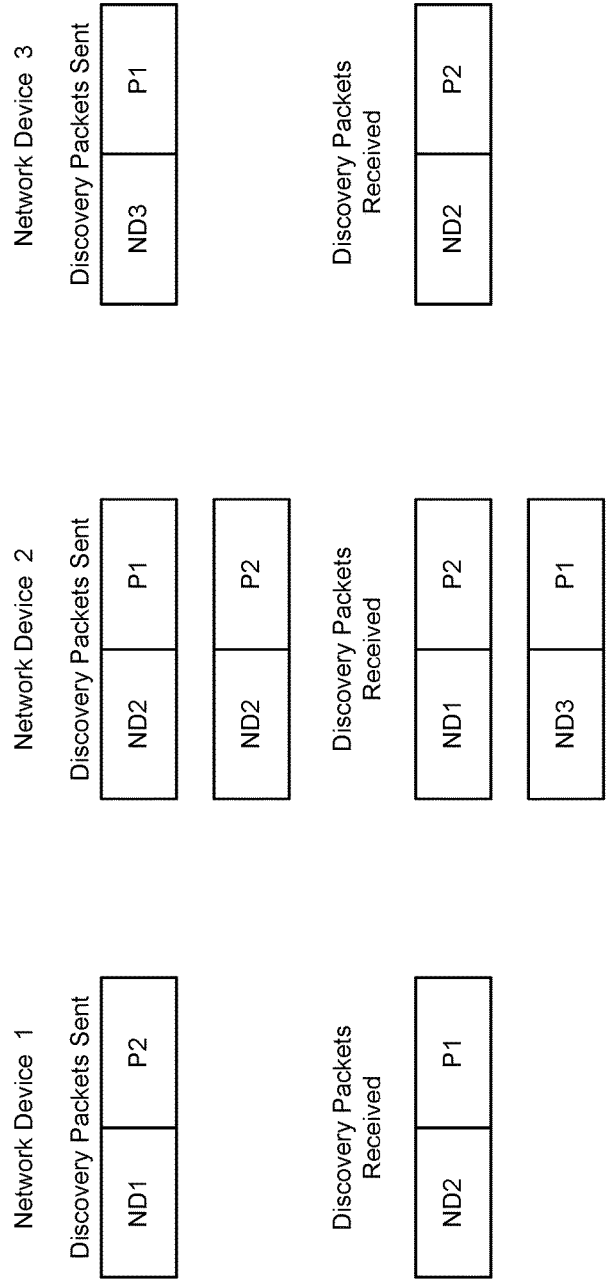
Figure 5C:
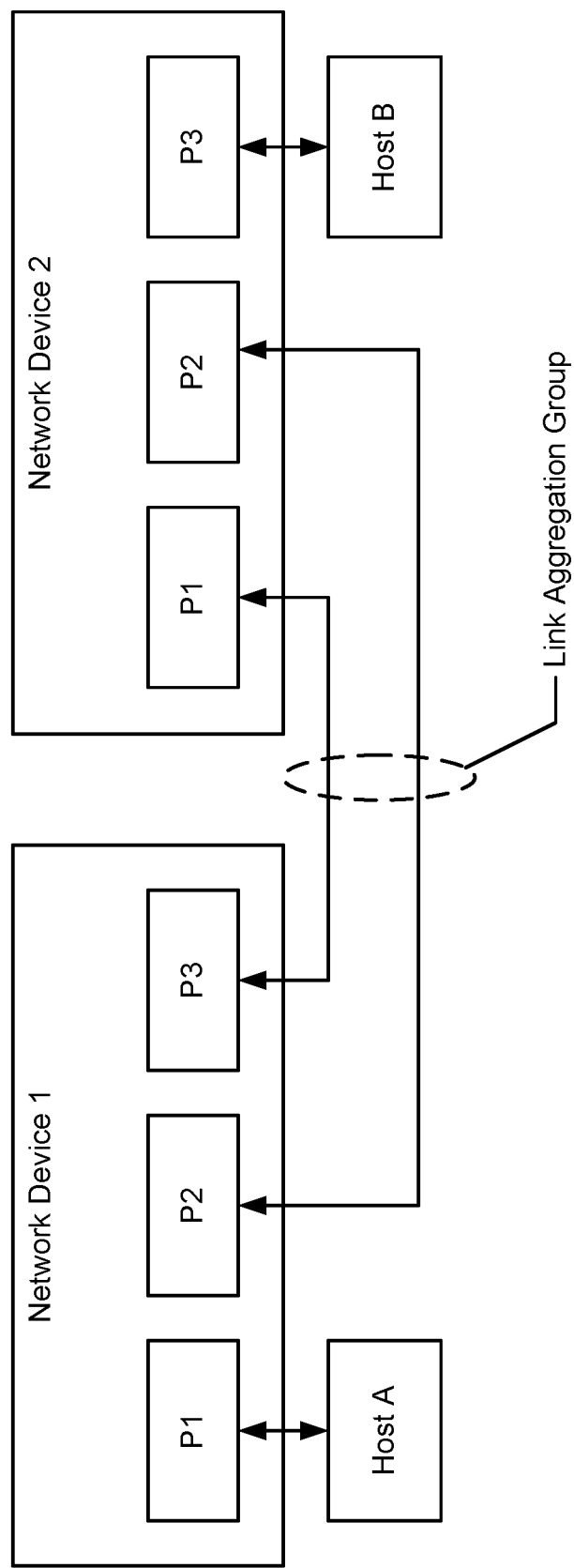

FIGS. 5A-5C show an example in accordance with one or more embodiments of the invention. The examples shown in FIGS. 5A-5C are not intended to limit the scope of the invention. Turning to FIGS. 5A-5B, FIGS. 5A-5B show an example of methods shown in FIGS. 4A-4B. More specifically, FIG. 5A shows a network that includes two hosts and three network devices. In this example, each of the network devices is configured to issue discovery packets in accordance with FIG. 4A and to process received discovery packets in accordance with FIG. 4B.

Referring to FIG. 5B, network device 1 is configured to issue one discovery packet with the following information: ND1+P2, where ND1 is the sending switch ID for network device 1 and P2 is the Egress Port ID corresponding to port 2. Further, network device 1 is configured to issue the aforementioned discovery packet from port P2. Network device 2 is configured to issue two discovery packets, one from each of port P1 and port P2. Specifically, a first discovery packet includes the following information ND2+P1 and the second discovery packet includes ND2+P2, where ND2 is the sending switch ID for network device 2, P1 is the egress port corresponding to port 1 and P2 is the egress port corresponding to port 2. Network device 2 is configured to issue the first packet from port P1 and the second packet from port P2. Finally, network device 3 is configured to issue one discovery packet with the following information: ND3+P1, where ND3 is the sending switch ID for network device 3 and P1 is the Egress Port ID corresponding to port 1. Further, network device 3 is configured to issue the aforementioned discovery packet from port P1. Though not shown in FIGS. 5A-5B, each of the discovery packets includes the same discovery MAC address and all network devices include the same discovery classification rule.

In accordance with FIG. 5B, network device 1 is configured to receive one discovery packet from network device 2 that includes the following information: ND2+P1. Using this information, network device 1 generates a topology entry with the following information: ND1, P2, ND2, P1. Further, network device 2 is configured to receive two discovery packets one from each of network device 1 and network device 3. Specifically, network device 2 receives discovery packets with the following information: ND1+P2 and ND3+P1. Using this information, network device 2 generates two topology entries as follows: (i) ND2, P1, ND1, P2 and (ii) ND2, P2, ND3, P1. Finally, network device 3 is configured to receive one discovery packet from network device 2 that includes the following information: ND2+P2. Using this information, network device 1 generates a topology entry with the following information: ND3, P1, ND2, P2.

Each of the network devices may generate a local layer 2 topology, which specifies to what each of the network devices is directly connected. The local layer 2 topology may be communicated to the other network devices in order for each of the network devices to generate a global layer 2 topology. For example, referring to FIG. 5A, the local layer 2 topology for network device 1 specifies that network device 1 is connected to host A on port P1 and to network device 2 via port P2. The global layer 2 topology for the network shown in FIG. 5A includes information about how at least two of the network devices are connected (directly or indirectly) to each other as well as to what other network entities each of the network devices is connected.

The network devices may be configured to monitor the network of which they are a part and periodically initiate discovery to verify that the layer 2 topology has not changed. In the event that the layer 2 topology has changed and the change falls outside a predefined tolerance—for example, there is less than a minimum number of links between two network devices—a notification may be sent to a network administrator or other corrective action may be initiated.

Turning to FIG. 5C, in the event a network device receives two (or more) discovery packets that include the same sending switch ID but different egress port IDs, the network device may identify the presence of a link aggregation group (LAG). For example, in FIG. 5C, network device 1 may issue a first discovery packet from port P2 and a second discovery packet from port P3. In this example, network device 2 receives two discovery packets from network device 1 and, based on this, determines the presence of a LAG between network device 1 and network device 2. In one embodiment of the invention, a LAG provides two or more separate physical connections between the network devices in the LAG.

In one embodiment of the invention, the ndOS includes a hypervisor. In one embodiment of the invention, a hypervisor is software that includes functionality to control the sharing of hardware resources on the network device. Specifically, the hypervisor includes functionality to virtualize the physical resources of the network device such that a virtual machine executing on the network device may share the physical resources of the network device with the ndOS. In one embodiment of the invention the hypervisor is configured to create a virtual machine on the network device and enable the virtual machine to execute an operating system.

In one embodiment of the invention, once an ndOS has discovered the presence of at least one other ndOS on the network, the ndOSes collectively may form a layer 2 fabric. In one embodiment of the invention, the creation of the fabric may be automatic, based on a user configured policy, directed explicitly by the user, or any combination thereof. In such instances the layer 2 fabric includes the ndOSes along with the network devices upon which they are executing. Every ndOS in the layer 2 fabric must be able to connect directly or indirectly to every other ndOS in the layer 2 fabric. In one embodiment of the invention, an ndOS is directly connected to a second ndOS if there is direct physical connection (via the external ports on the corresponding network devices). In one embodiment of the invention, an ndOS is indirectly connected to a second ndOS if the ndOS can communicate with the second ndOS through one or more intermediate ndOSes. (see FIG. 6)

In one embodiment of the invention, each ndOS maintains local configuration information and global configuration information. Local configuration information refers to configuration information about network entities directly connected to the network device on which the ndOS is executing. Global configuration information refers to configuration information for one or more other ndOSes in the layer 2 fabric. In one embodiment of the invention, each ndOS sends its local configuration information to all other (or a subset thereof) ndOSes in the layer 2 fabric and receives local configuration information (which is referred to a global configuration information from the perspective of the receiving ndOS) from all other (or a subset thereof) ndOSes in the layer 2 fabric.

In one embodiment of the invention, the local configuration information for an ndOS may include, but is not limited to, (i) the local layer 2 topology (as described above), (ii) the access control lists (ACLs) for any network entity in the local layer 2 topology, (iii) local state information. In one embodiment of the invention, the ACL for a given network entity may include, but is not limited to, (i) with which network entities the network entity can communicate; (ii) maximum latency for packets transmitted from the network entity; (iii) total bandwidth limits for the network entity; (iv) bandwidth limits for various flows associated with the network entity; (v) priority of the packets issued by the network entity; (vi) guaranteed bandwidth for the network entity; (vii) bandwidth guaranteed for various flows associated with the network entity. The ACL may specify other information not included above without departing from the invention.

Figure 8A:
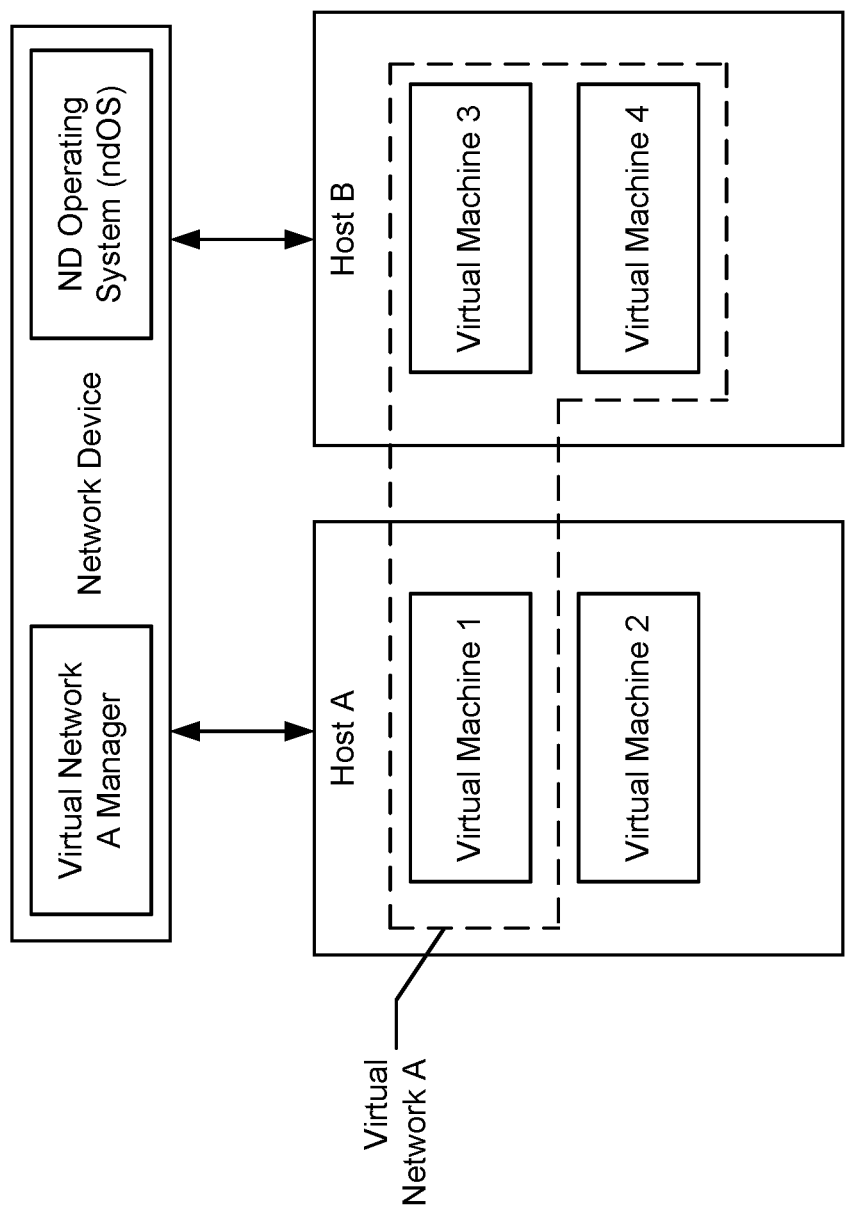
FIGS. 8A-8C show examples in accordance with one or more embodiments of the invention.
Figure 8B:
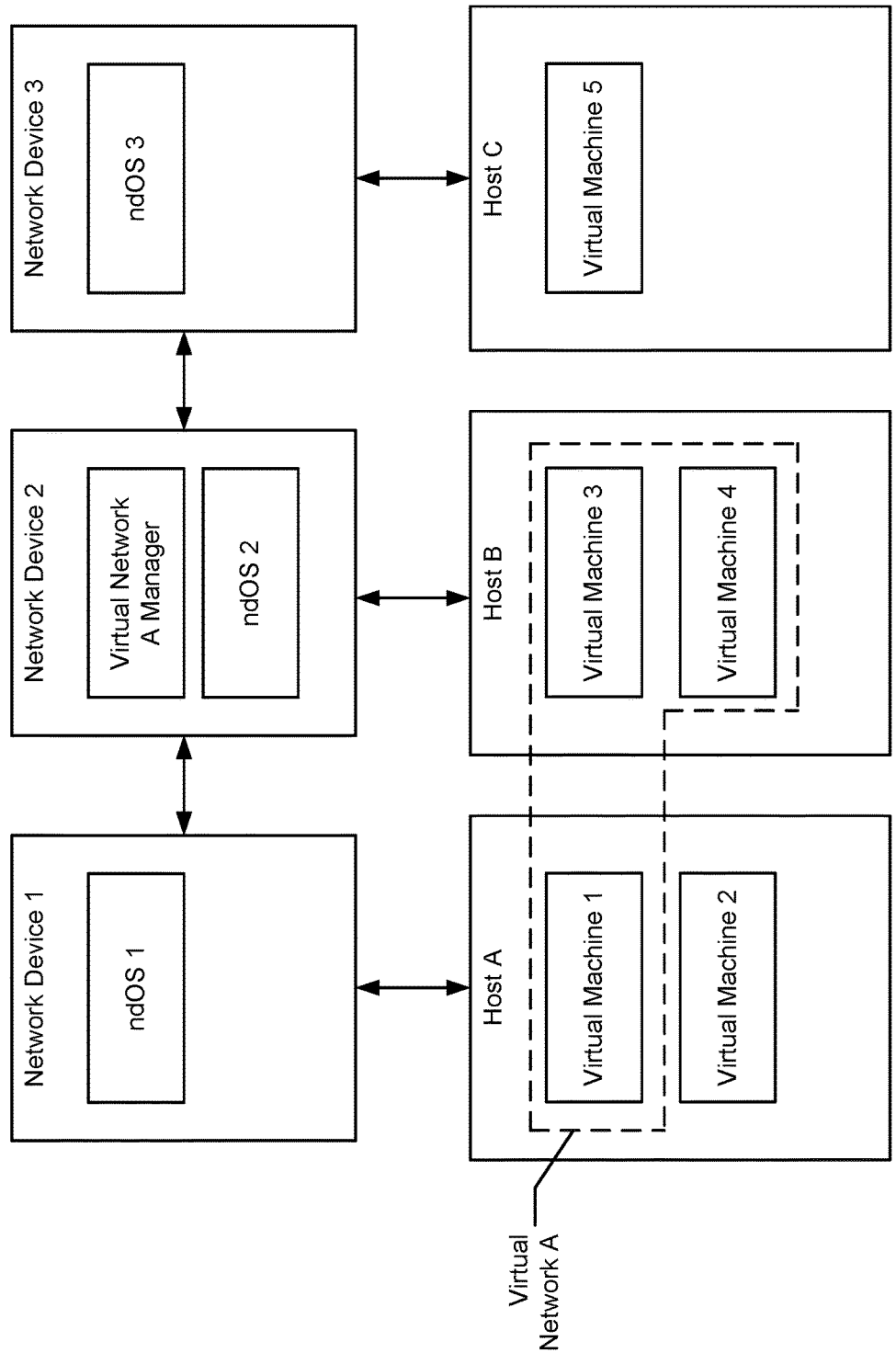
Figure 8C:
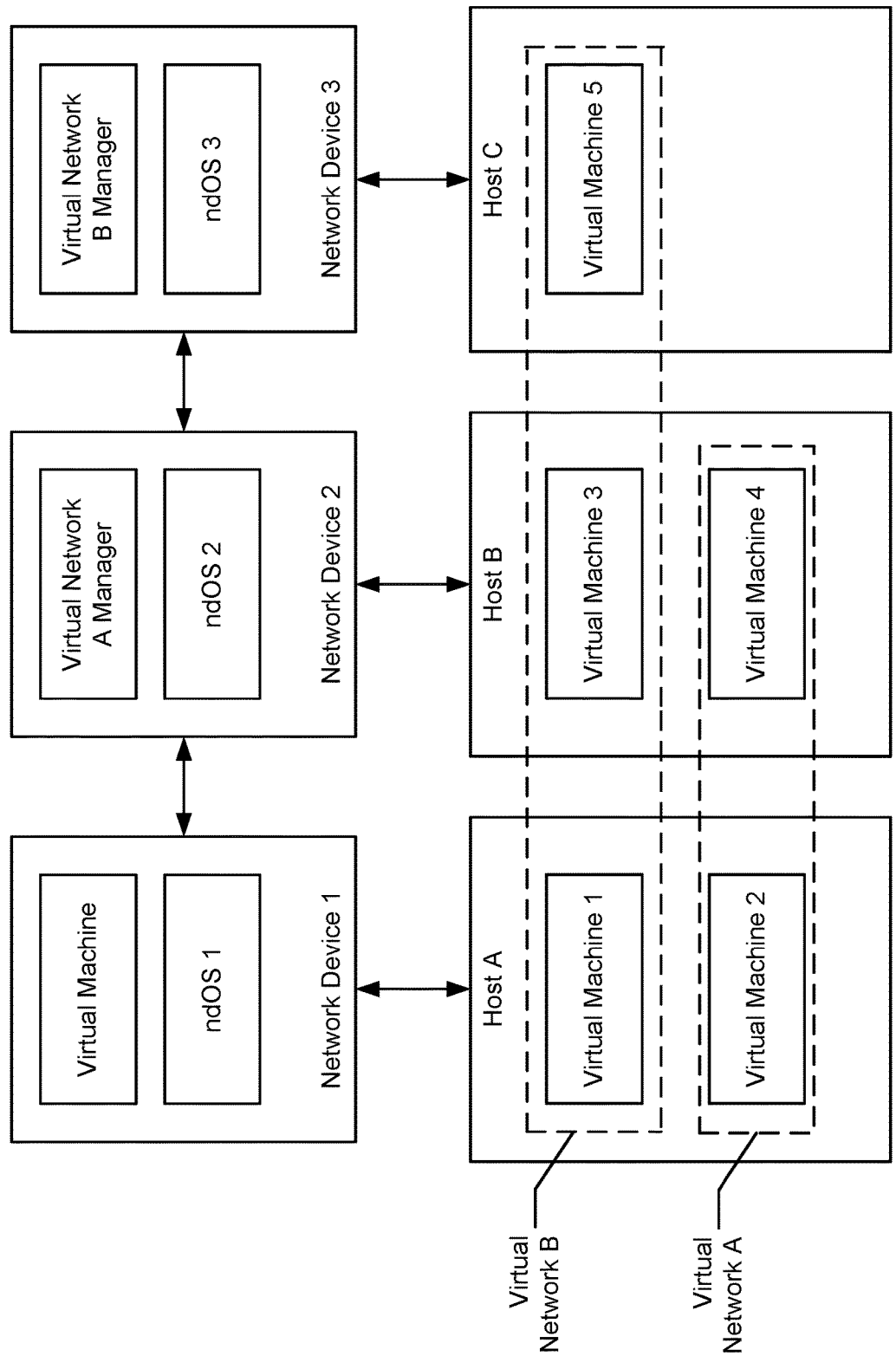

In one embodiment of the invention, a given ACL may be applied to a virtual network (see FIGS. 8A-8C). In such instances, the ACL may be applied to multiple network entities and be implemented by multiple ndOSes. In one embodiment of the invention, the ACL for a virtual network may include, but is not limited to, (i) which network entities in the virtual network can communicate with each other; (ii) maximum latency for packets transmitted between network entities in the virtual network; (iii) total bandwidth limits for the virtual network; (iv) bandwidth limits for various network entities or flows in the virtual network; (v) priority of the virtual network relative to other virtual networks in the layer 2 fabric; (vi) guaranteed bandwidth for the virtual network; (vii) bandwidth guaranteed for various network entities or flows in the virtual network. The ACL may specify other information not included above without departing from the invention.

In one embodiment of the invention, local state information for a given ndOS may include, but is not limited to, (i) a listing of all virtual networks that any of the virtual machines connected to the network device belongs; (ii) current traffic utilization, congestion, and/or latency of the virtual machines identified in the local layer 2 topology; (iii) current traffic utilization, congestion, and/or latency for one or more virtual networks identified in (i), and/or any other analytics information about the operation of the network device.

In one embodiment of the invention, one or more ndOSes in the layer 2 fabric may communicate, directly or indirectly, (over the layer 2 fabric) the local configuration information to other ndOSes in the layer 2 fabric using a reliable communications protocol. Those skilled in the art will appreciate that any reliable communications protocol may be used without departing from the invention.

In one embodiment of the invention, any global configuration changes—i.e., changes that are implemented on all network devices in the layer 2 fabric are performed using a two phase commit—in the first phase resources/configuration changes are requested/proposed and in the second phase the resources are reserved/configuration changes committed.

In one embodiment of the invention, when a new ndOS is added to the layer 2 fabric, the new ndOS receives (or otherwise obtains) the current global configuration information for one or more of the other ndOSes in the layer 2 fabric.

In one embodiment of the invention, the local and/or global configuration information are stored in the persistent memory of one or more of the network devices in the layer 2 fabric. Further, the local and/or global configuration information may be versioned such that an individual ndOS, a subset of ndOSes, or all ndOSes in the layer 2 fabric may be reconfigured using a prior saved local and/or global configuration information. In one embodiment of the invention, the local and/or global configuration information is periodically saved using well known snapshot techniques.

In one embodiment of the invention, each network device may periodically (with the period varying based on the implementation) record the local configuration information (which local state information). This local configuration information from each network device may be transmitted to a single location in the layer 2 fabric. A user may then access the accumulated local configuration information to obtain a current global view of the layer 2 fabric.

Figure 6:
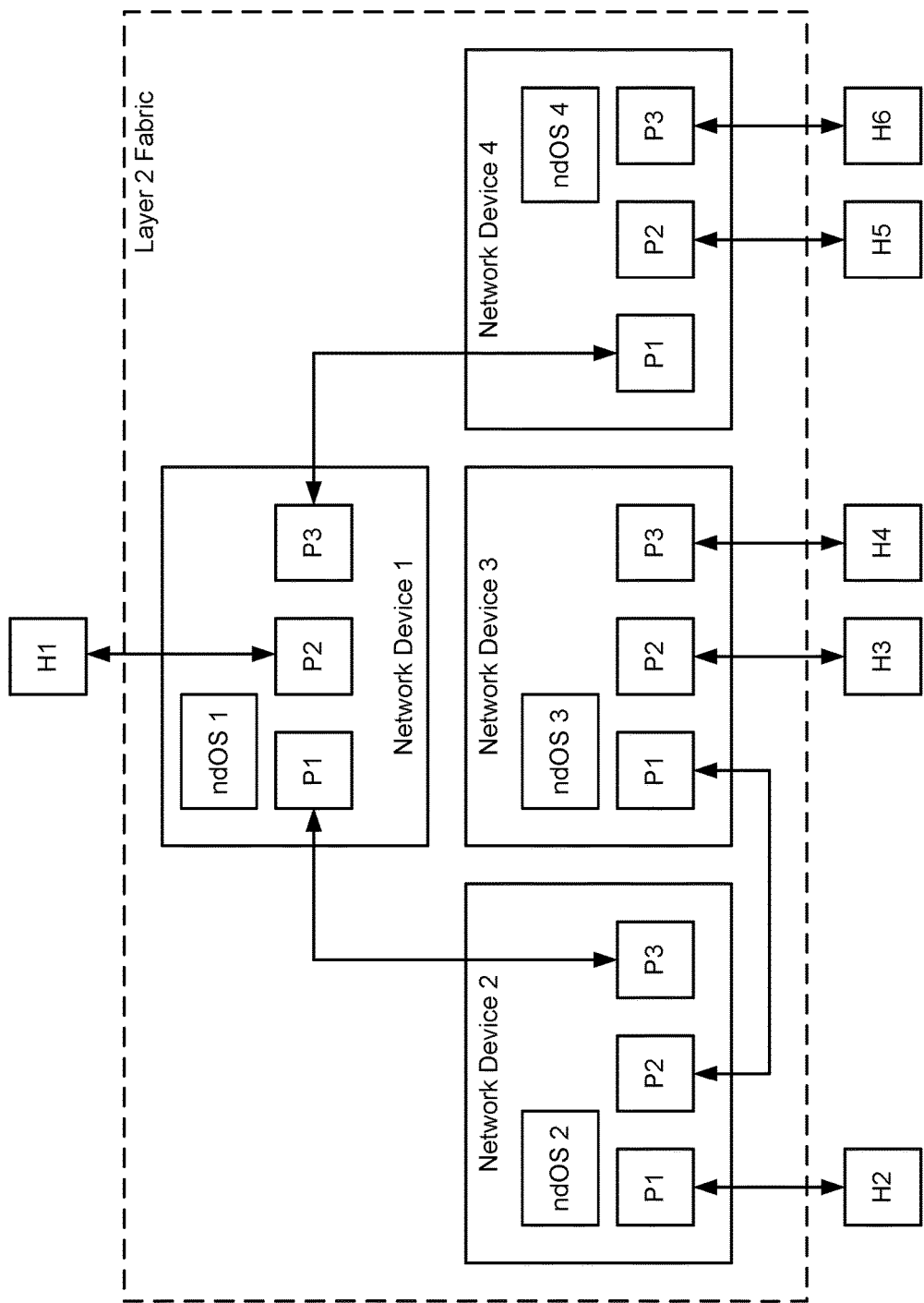
FIG. 6 shows a layer 2 fabric in accordance with one or more embodiments of the invention.

FIG. 6 shows an example of a layer 2 fabric in accordance with one or more embodiments of the invention. As shown in FIG. 6, the layer 2 fabric includes four network devices (network device 1, network device 2, network device 3, and network device 4). Each of the network devices in the layer 2 fabric includes an ndOS that is configured to determine the layer 2 topology of the layer 2 fabric as described above with respect to FIGS. 4A-5C.

In the example shown in FIG. 6, network device 1 is directly connected to network device 2 and network device 4, and is indirectly connected to network device 3. Network device 2 is directly connected to network device 1 and network device 3, and is indirectly connected to network device 4. Network device 3 is directly connected to network device 2 and is indirectly connected to network device 1 and network device 4. Finally, network device 4 is directly connected to network device 1 and is indirectly connected to network devices 2 and 3. A given network device may communicate directly with any directly connected network device and may use other network devices in the layer 2 fabric to facilitate indirect communication with indirectly connected network devices.

The addition of another network device to the layer 2 fabric shown in FIG. 6 may trigger the newly added network device as well as one or more of the existing network devices to perform the methods described in FIGS. 4A-4B above. Further, the removal of a network device from the layer 2 fabric may also trigger one or more of the existing network devices to perform the methods described in FIGS. 4A-4B above. Regardless of which network device(s) performs the methods shown in FIGS. 4A-4B, the results of performing the aforementioned methods may be communicated to all other network devices in the layer 2 fabric.

In one embodiment of the invention, each ndOS is configured to monitor the network device on which it is executing to determine if (or when) there is a change in the local configuration information. If there is a change in the local configuration information, the ndOS is configured to communicate all (or a subset of) the updated local configuration information directly or indirectly to all of the other ndOSes in the layer 2 fabric.

In one embodiment of the invention, a client executing on any host connected to any network device in the layer 2 fabric may initiate a request (described above) to the layer 2 fabric. In such cases, the request may be initially received by the closest ndOS to the host. For example, if host H5 issued a request to the layer 2 fabric, the request may be initially received by ndOS 4. Based on the nature of the request, ndOS 4 may send the request to one or more of the ndOSes in the layer 2 fabric to process the request. In one embodiment of the invention, the client making the request has full visibility of the layer 2 fabric and, as such, can issue requests to any network entity in or connected to the layer 2 fabric.

In one embodiment of the invention, the request may include, but is not limited to, (i) a request to migrate a VM from one host to another host, where both hosts are connected to the layer 2 fabric; (ii) a request to change an ACL for a given network entity, where the network entity is connected to the layer 2 fabric via a network device that is part of the layer 2 fabric; (iii) a request to perform analytics on a flow that is passing through at least one network device in the layer 2 fabric; (iv) a request to create a VM on a particular network device in the layer 2 fabric; (v) a request to create a VM on a host connected to a network device in the layer 2 fabric; (vi) a request to change a configuration parameter on a particular network device in the layer 2 fabric; (vii) a request to change a configuration parameter on two or more network devices in the layer 2 fabric; and (viii) a request to create a notification when there is a change in the layer 2 fabric (e.g., network device added, network device removed, change in link status of a link between network devices in the layer 2 fabric, creation of a VM on a network device in the layer 2 fabric, etc.). The requests may include other actions to be performed not specified above without departing from the invention.

As discussed above, the request may be a request to perform analytics. In one embodiment of the invention, the request to perform analytics may include a request to obtain all packets for a given flow (or set of flows), where the flow is passing through one network device on the layer 2 fabric. Because the layer 2 fabric includes a distributed OS, a request to obtain all packets for a given flow may be received by any ndOS in the layer 2 fabric. As described in FIG. 7, the ndOS that receives the request will forward the request to the appropriate network device. When the request is to obtain all packets for a given flow (or set of flows), the request is forwarded to a network device (referred to as monitoring network device) through which the flow passes. As described in FIG. 2 above, the monitoring network device may program its switch fabric classifier to identify all packets for the flow and to send all identified packets to the control processor (or NPU). Upon receipt the control processor (or NPU) may make a copy of the packet. The monitoring network device may accumulate the copies of the packets and then subsequently transmit (via the network devices in the layer 2 fabric) the copies of the packets to the ndOS that initially received the request. Upon receipt, the ndOS may forward the copies of the packets to the host from which the request was received.

Figure 7:
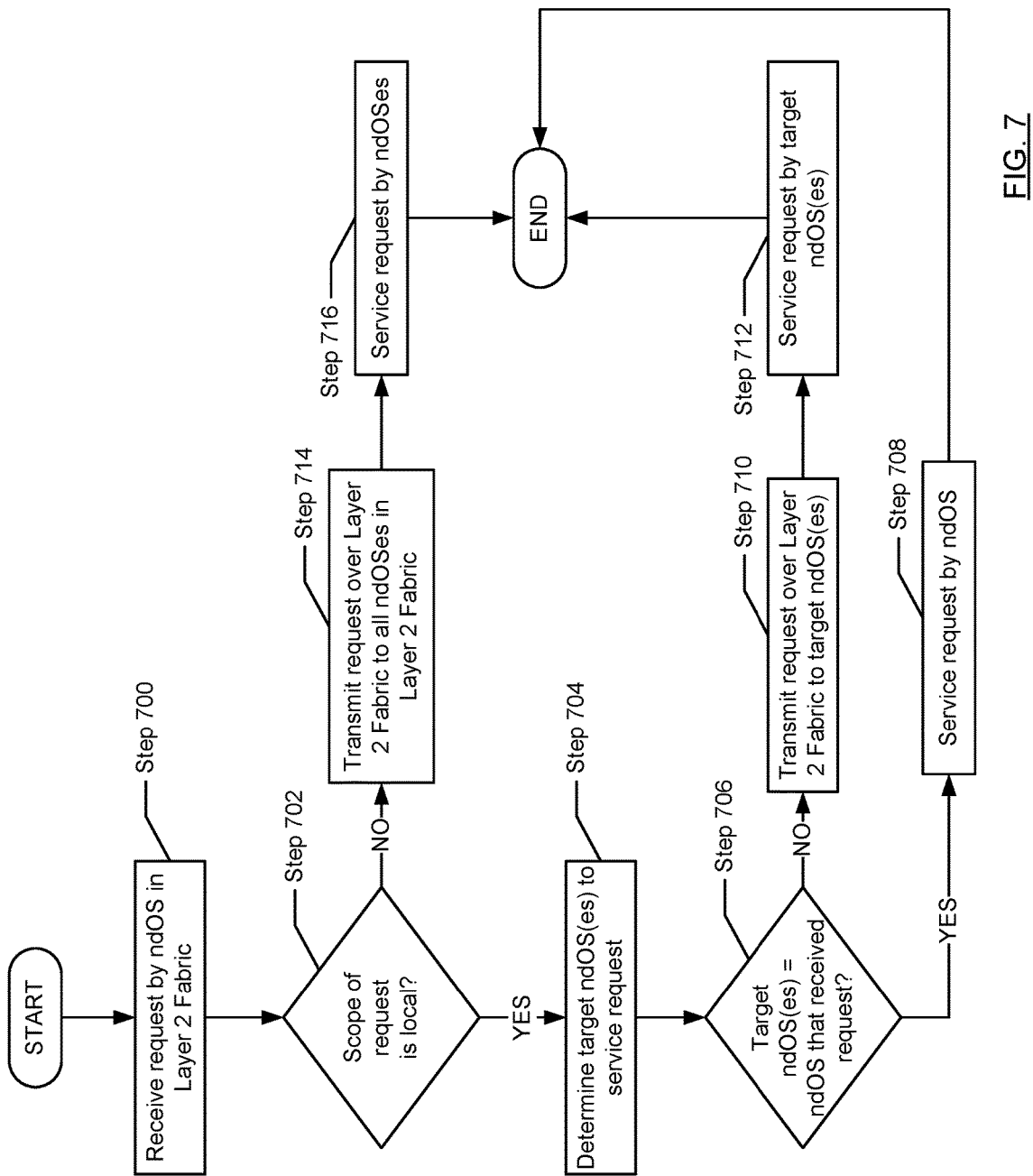
FIG. 7 shows a flowchart for processing requests by the layer 2 fabric in accordance with one or more embodiments of the invention.

FIG. 7 shows a flowchart for serving requests by the layer 2 fabric in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In step 700, a request is received by an ndOS in the layer 2 fabric. In step 702, a determination is made about whether the scope of the request is local. Said another way, the ndOS makes an initial determination about whether the request is to be serviced by all ndOSes in the layer 2 fabric (which signifies that the request has a global scope) or by only a subset of the ndOSes in the layer 2 fabric. If the request is local in scope, the process proceeds to Step 704; otherwise the process proceeds to step 714.

In step 704, a target ndOS(es) in the layer 2 fabric to service the request is identified. More specifically, the request is analyzed to determine which ndOS(es) should service the request. For example, referring to FIG. 6, if the request is received by ndOS 1 and is related to a change in the ACL for a VM executing on host H3, then the appropriate ndOS to service the request is ndOS 3. If the event requires multiple ndOSes to service the request, all ndOSes required to service the request are identified. In step 706, a determination is made about whether the ndOS that received the request is the target ndOS. If the ndOS that received the request is the only ndOS required to service the request, the process proceeds to Step 708; otherwise the process proceeds to Step 710.

In step 708, the ndOS services the request. The process of servicing the request may vary based on the nature of the request. For example, if the request is for migrating a virtual machine, then the servicing the request may include performing the steps in FIG. 9. Continuing with FIG. 7, in step 710, the request is transmitted, via the network devices in the layer 2 fabric, to the ndOSes identified in Step 704. In step 712, the ndOSes service the request. The process of servicing the request may vary based on the nature of the request. In step 714, the request is transmitted to, via the network devices in the layer 2 fabric, to all other ndOSes. In step 716, the ndOSes service the request. The process of servicing the request may vary based on the nature of the request.

In one embodiment of the invention, the ndOS includes functionality to execute a virtual network manager. The virtual network manager may either be implemented as an application executing on the ndOS or an application executing in a virtual machine created by the ndOS (or more specifically by the hypervisor functionality in the ndOS). The virtual network manager is configured to manage communication between one or more virtual machines (collectively referred to as a virtual network) executing on hosts connected to one or more network devices.

In one embodiment of the invention, the virtual network is defined as a group of MAC addresses, where each MAC address corresponds to a network entity in the virtual network. Alternatively, the virtual network may be defined using one or more of the following: VLAN tag, VLAN Q-in-Q tag, external port, and Multiprotocol Label Switching (MPLS) labels. Those skilled in the art will appreciate that other identifiers may be used to create the virtual network without departing from the invention.

In one embodiment of the invention, the virtual network manager may use ACLs (as described above) to manage the communication between the network entities in the virtual network. The virtual network may span multiple hosts connected to a single network device or span multiple hosts connected to multiple network devices. FIGS. 8A-8C show various examples in accordance with one or more embodiments of the invention. The examples are not intended to limit the scope of the invention.

Referring to FIG. 8A, FIG. 8A shows virtual network A that includes virtual machines located on separate hosts connected to the same network device. In this example, virtual network manager A located on the network device is executing in a virtual machine (not shown).

Referring to FIG. 8B, 8B shows virtual network A that includes virtual machines on hosts connected to two separate network devices. In this example, virtual network manager A is located on network device 2 and is configured to manage the communication between the virtual machines by sending instructions to ndOS 1 and ndOS 2. In this example, virtual network manager A is executing in a virtual machine (not shown) on network device 2.

Referring to FIG. 8C, FIG. 8C shows virtual network A that includes two virtual machines on hosts connected to two separate network devices and virtual network B that includes three virtual machines on hosts connected to three separate network devices. In this example, network device 3 includes virtual network B manager and network device 2 includes virtual network A manager. Virtual network A manager is configured to manage the communication between the virtual machines in a virtual network A by sending instructions to ndOS 1 and ndOS 2. Virtual network B manager is configured to manage the communication between the virtual machines in virtual network B by sending instructions to ndOS 1, ndOS 2, and ndOS 3. In this example, virtual network manager A is executing in a virtual machine (not shown) on network device 2 and virtual network manager B is executing in a virtual machine (not shown) on network device 3. In addition, network device 1 includes a virtual machine, which is created by ndOS 1. The virtual machine may include functionality to process packets (or provide other services of virtual network A and/or Virtual network B) in accordance with one or more embodiments of the invention. Examples of services provided by the virtual machine may include, but are not limited to, Dynamic Host Configuration (DHCP) services, load balancing services, and Domain Name System (DNS) services.

In one embodiment of the invention, a cluster may be formed in the layer 2 fabric. More specifically, two or more ndOSes within a layer 2 fabric may be logically joined to create a cluster. The cluster membership is enforced by the ndOSes that make up the cluster. In one embodiment of the invention, a given layer 2 fabric may include multiple clusters—where each ndOS is associated with a particular cluster and where an ndOS may only belong to a single cluster. Virtual networks may then be configured to operate on a cluster (instead of across the entire layer 2 fabric). In such cases, virtual machines within a virtual network that is configured to operate on a particular cluster, may only be migrated to hosts that are directly connected to a network device executing an ndOS that is in the cluster. Further, ndOSes in a given cluster may associate a VLAN tag with packets issued by network entities within the cluster. In this manner, the scope of the VLAN tag is limited to the cluster and, as such, the VLAN tag only has to be unique with respect to cluster. Said another way, the same VLAN tag may be reissued by different clusters within the same layer 2 fabric.

In addition, each ndOS may configure the corresponding VLAN tag on the switch fabric classifier to enforce/provide the user configured QoS/SLA. In such scenarios, each virtual network has an associated QoS/SLA that the Layer 2 fabric enforces.

Figure 9:
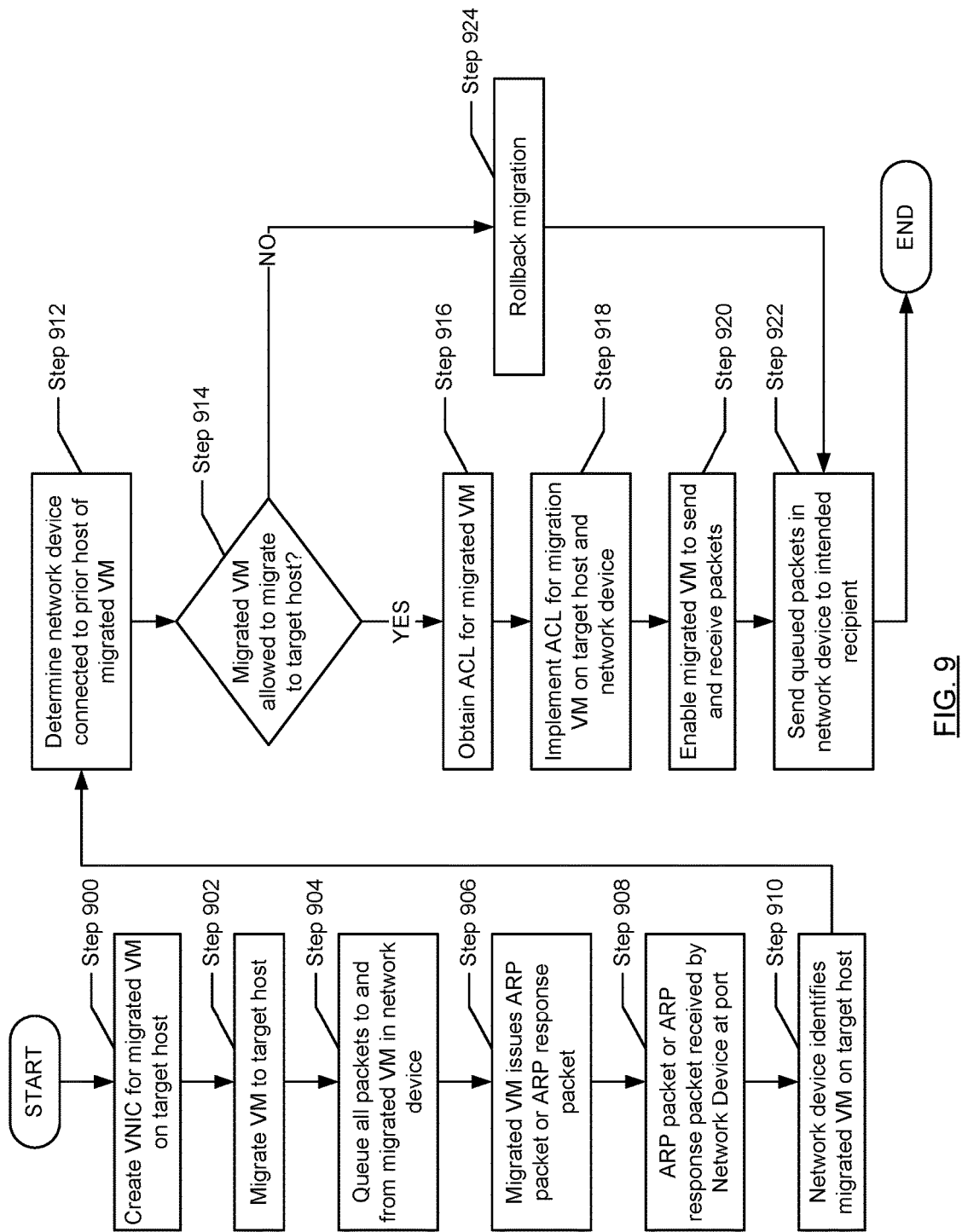
FIG. 9 shows a flowchart in accordance with one or more embodiments of the invention.

In one embodiment of the invention, virtual network managers include functionality to determine whether a given virtual machine located on a particular host may be migrated to another host. FIG. 9 shows a flowchart in accordance with one or more embodiments of the invention. More specifically, FIG. 9 shows a flowchart detailing the migration of a virtual machine in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

Turning to FIG. 9, in step 900, a virtual network interface card (VNIC) is created on the target host. In one embodiment of the invention, the VNIC virtualizes a physical network interface card on a host.

In Step 902, the virtual machine (VM) is migrated to a target host. In one embodiment of the invention, migrating the VM includes installing the VM on the target host and specifying that the VM can communicate with the network device using the VNIC created in Step 900. In one embodiment of the invention, the binary associated with the VM is transmitted to the target machine via network devices in the layer 2 fabric.

In Step 904, after the VM has been migrated but prior to Step 918, all packets destined for the VM and all packets sent by the VM are temporarily queued in the network device connected to the target host. In Step 906, the migrated VM issues an address resolution protocol (ARP) packet or an ARP response packet. In Step 908, the ARP packet or the ARP response packet is received by the network device at an external port. In Step 910, in response to receiving the ARP packet or the ARP response packet, the network device determines than a newly migrated VM is attached to the external port of the network device. More specifically, the network device identifies that the external port has received packets with a source MAC address, where the source MAC address of the packets is different that the source MAC address of packets previously received on the particular external port.

In Step 912, the network device which is currently connected to the target host determines the network device that was connected to the host that was previously executing the now migrated VM.

In Step 914, a determination is made about whether the VM is allowed to migrate to the target host. In one embodiment of the invention, the VM is allowed to migrate to the target host if the target host has sufficient bandwidth and/or physical resources to satisfy any SLA/QoS requirements specified by the VM. If the VM is not allowed to migrated to the target host, the process proceeds to Step 924; otherwise, the process proceeds to Step 916.

In Step 916, the ACL for the migrated VM is obtained from the network device that was connected to the host that was previously executing the now migrated VM. In Step 918, the ACL obtained in Step 916 is implemented on the network device directly connected to the target host and/or on the target host. In Step 920, the migrated VM is allowed to send and receive packets. In Step 922, all queued packets (i.e. packets sent from the migrated VM or destined for the migrated VM) are sent to their corresponding destinations. In Step 924, the migration is rolled back such that the VM returns to the host on which it was previously executing. The process then proceeds to Step 922.

FIGS. 10A-10D show an example for migrating a virtual machine in accordance with one or more embodiments of the invention. The example is not intended to limit the scope of the invention.

Figure 10A:
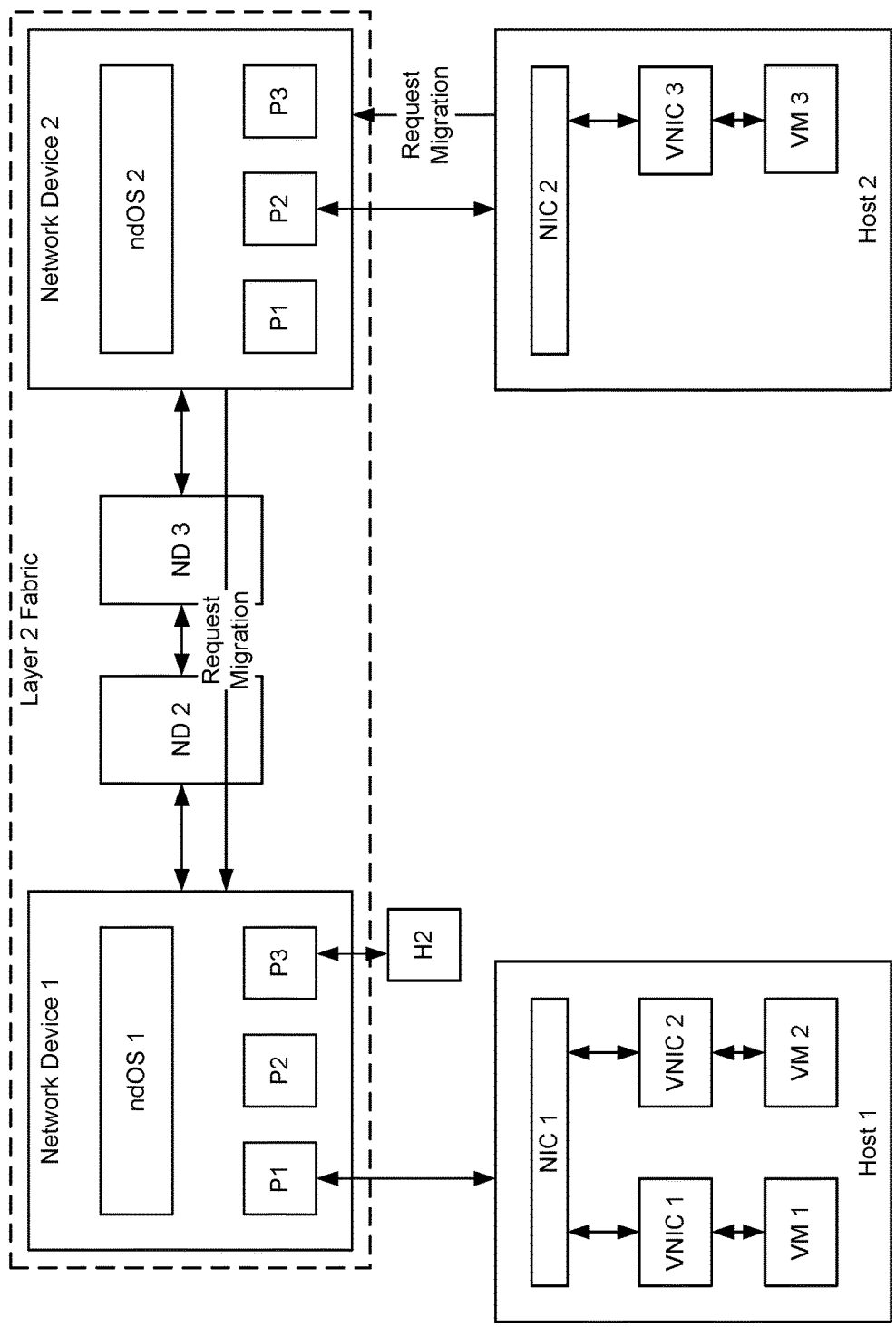
FIGS. 10A-10D show an example in accordance with one or more embodiments of the invention.

Referring to FIG. 10A, consider the scenario in which Host 2 sends a request to ndOS 2 to migrate VM 1 to Host 2. In response to receiving the request, ndOS 2 first determines to which network device VM 1 is connected. In this example, ndOS 2 determines that VM 1 is connected to network device 1. Accordingly, ndOS 2 sends a request to network device 1 to migrate VM 1 to host 2. For the purposes of this example assume that VM 1 is able to be migrated to Host 2.

Figure 10B:
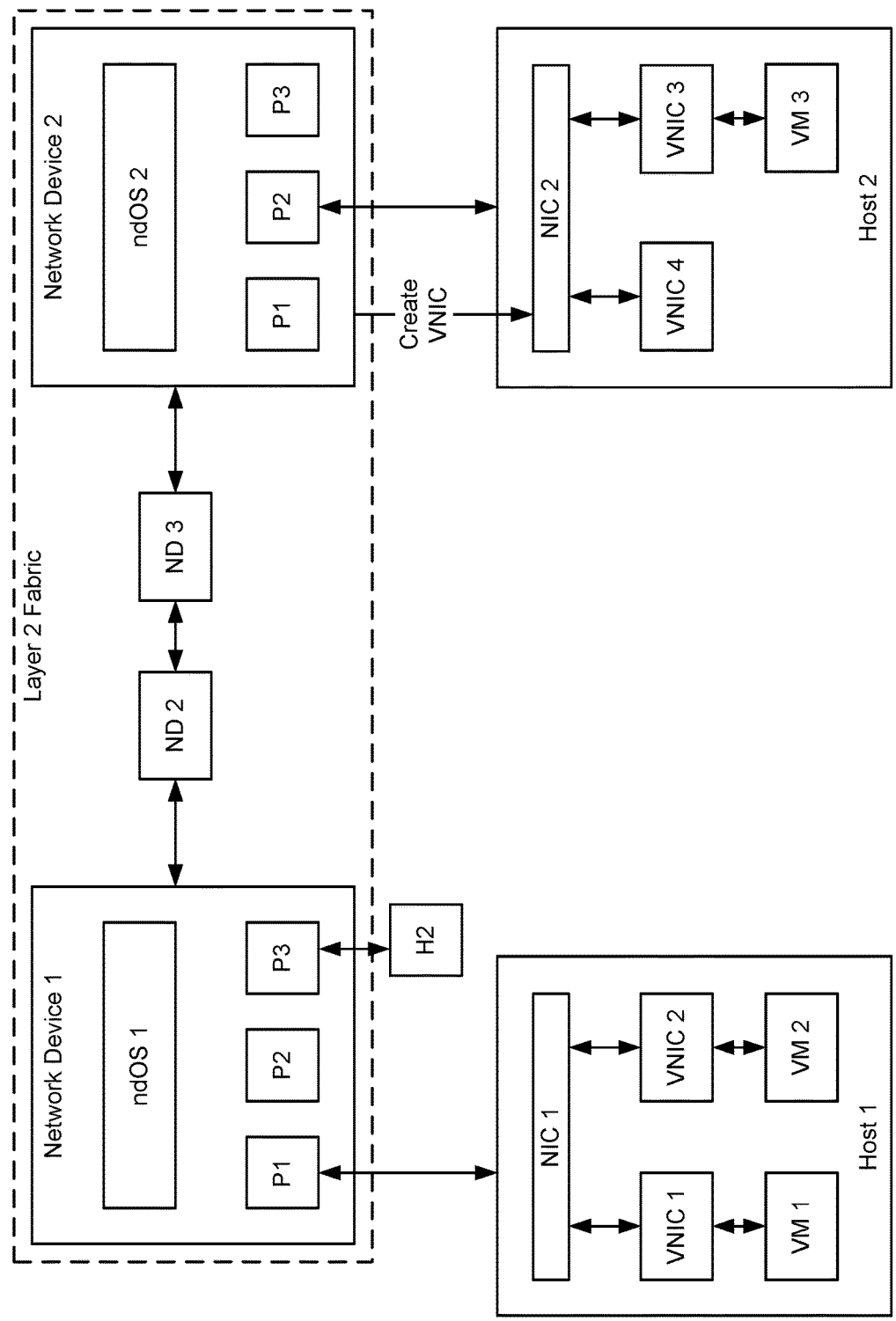

Referring to FIG. 10B, before, concurrently, or after sending the request to ndOS 1, ndOS 2 sends a request to the host to create a new VNIC and to specify a default ACL for VM 1. In one embodiment of the invention, the default ACL is empty. As shown in 10B, NIC 2 creates VNIC 4. In one embodiment of the invention, NIC 2 implements Single Root I/O Virtualization (SR-IOV) to create VNIC 4.

Figure 10C:
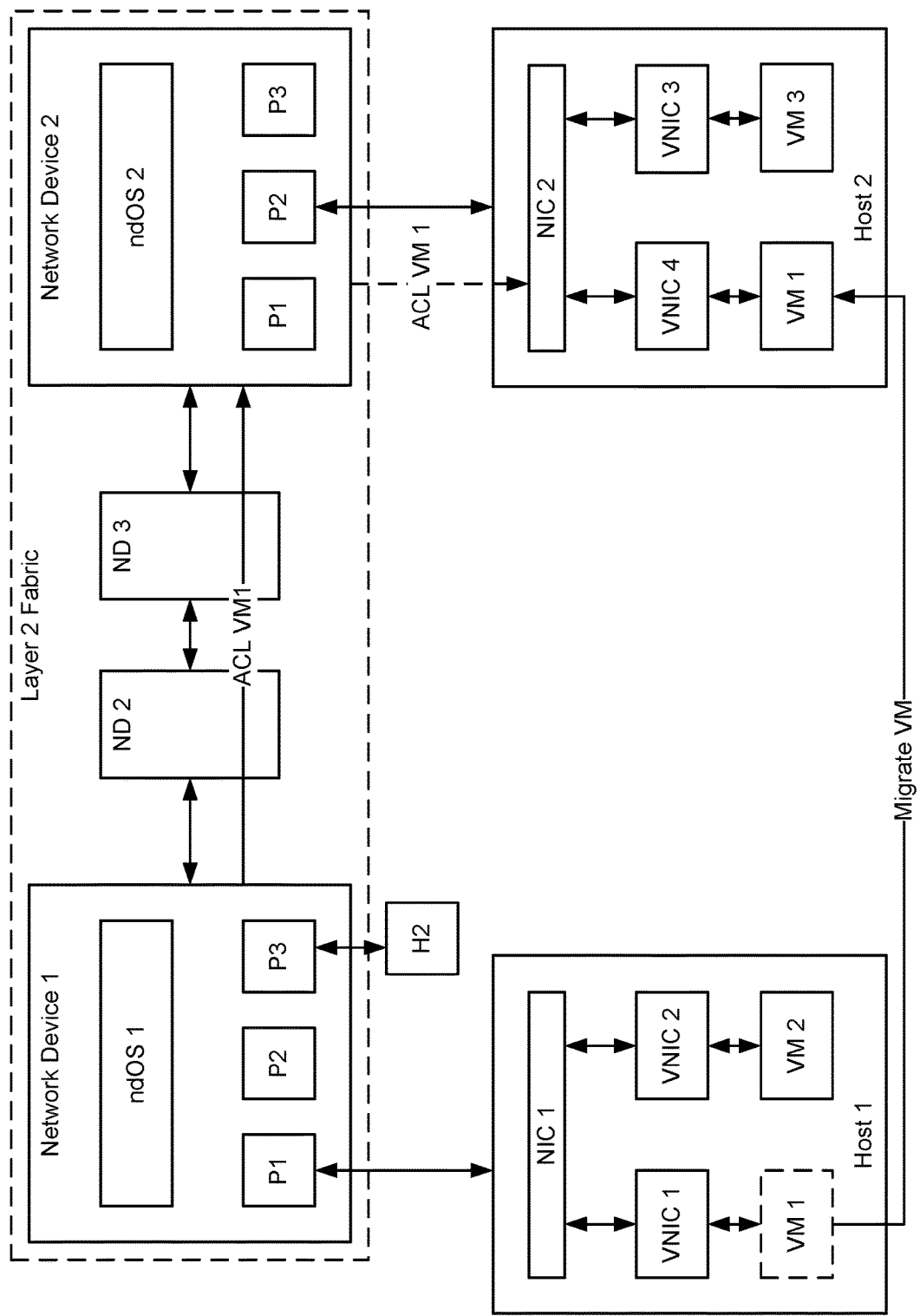

Referring to FIG. 10C, ndOS 1 migrates VM 1 to Host 2 and the ACL for VM 1 (denoted as ACL VM 1) that is currently implemented on ndOS 1 and/or Host 1 to ndOS 2. Though not shown in FIG. 10C, VM 1 is migrated via the layer 2 fabric to ndOS 2. Upon receipt by ndOS 2, VM 1 is migrated to Host 2. Host 2, upon receipt of VM 1, installs VM 1 and configures VM 1 to communicate with network device 2 via VNIC 4. Upon receipt of ACL VM 1, ndOS 2 takes the necessary steps to enforce ACL VM 1 (including configuring network device 2 and Host 2).

Figure 10D:
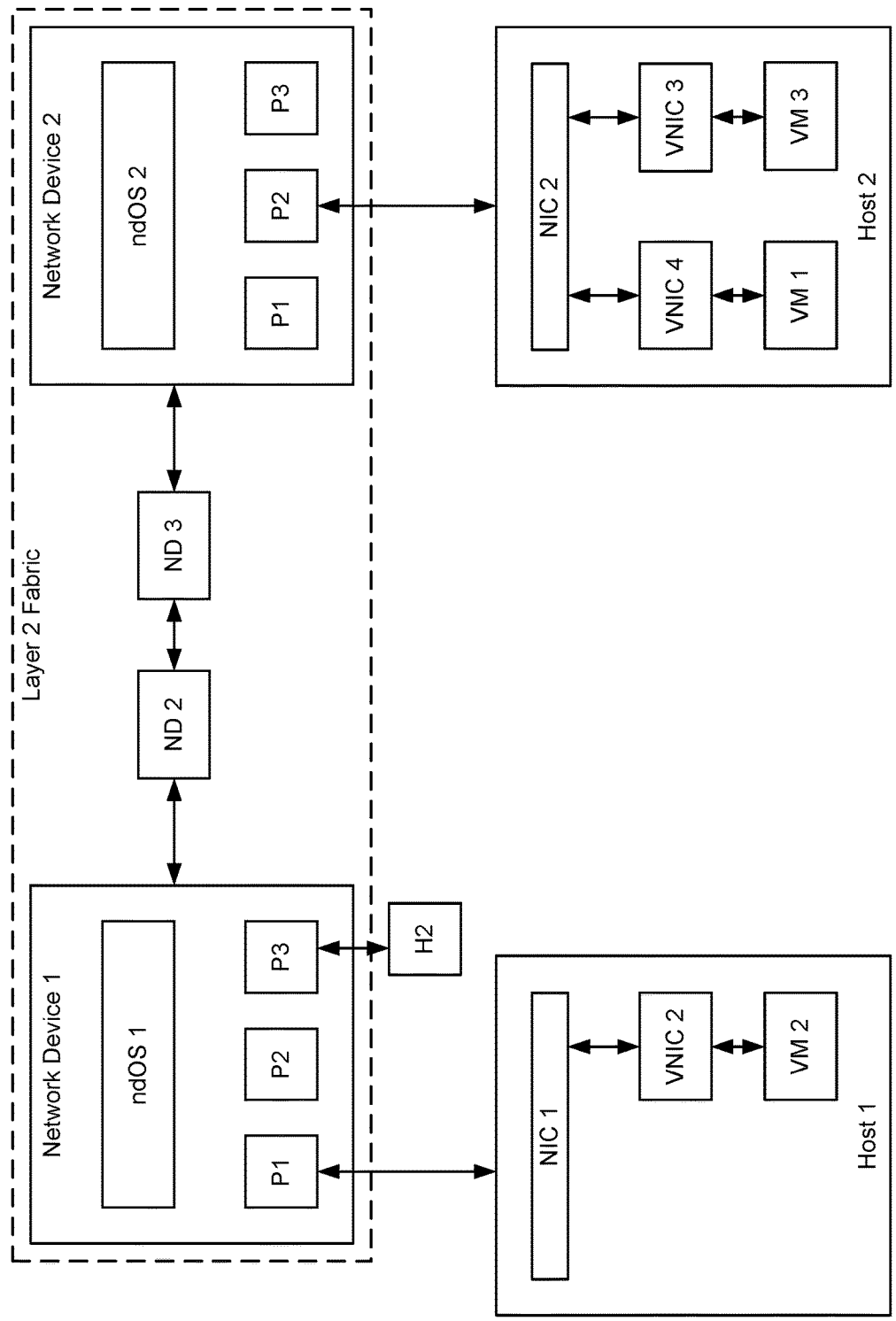

Referring to FIG. 10D, once the migration is complete, VNIC 1 is removed from Host 1. Though not shown in FIGS. 10A-10C, during the migration process, packets for VM 1 and packets issued by VM 1 are queued in the layer 2 fabric. In one embodiment of the invention, the packets are queued in network device 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   generating, by a network device, a local topology that identifies which network entities are connected to each external port of the network device, wherein the network device is configured to execute a network device operation system (ndOS), wherein the network device is configured to share information associated with the local topology with other ndOS network devices that execute the ndOS;
   receiving one or more remote local topologies from respective one or more ndOS network devices; and
   generating a global topology based on the local topology and the one or more remote local topologies, wherein the global topology is shared by the network device and the ndOS network devices executing ndOS, wherein the global topology identifies which entities are connected to one or more of the ndOS network devices, and
   receiving a packet with a destination media access control (MAC) address; determining that the destination MAC address is not in the local topology; and sending, by the network device, a discovery packet through a first external port to a second ndOS network device implementing ndOS, the discovery packet including a first device ID of the network device and a port ID of the first external port in the network device.

2. The method as recited in claim 1, further including:
   transmitting, from the network device, the local topology to one or more of the ndOS network devices.

3. The method as recited in claim 1, further including:
   transmitting, from the network device, information of the global topology to one or more of the ndOS network devices.

4. The method as recited in claim 1, further including:
   receiving, at a first ingress port of the network device, a second discovery packet having a sending device ED and an egress port ED; and
   adding an entry to the local topology, the entry including the network device ED, a first ingress port ED; the sending device ED, and the egress port ED.

5. The method as recited in claim 1, wherein the discovery packet further includes a discovery media access control (MAC) address utilized by all ndOS network devices for exchanging discovery packets.

6. The method as recited in claim 5, wherein the ndOS of the network device is configured to create a discovery classification rule specifying that any received packet with the discovery MAC address is to be processed by the ndOS.

7. The method as recited in claim 1, further including:
   updating the local topology based on the received one or more remote local topologies.

8. The method as recited in claim 7, further including:
   sending the updated local topology to one or more of the ndOS network devices.

9. The method as recited in claim 1, wherein each ndOS network device is configure to store topology information for other ndOS network devices, wherein an entry in the global topology includes a receiving device ID, an ingress port ID of the receiving device ID, a sending device ID, and an egress port ID of the sending device ID.

10. A network device, comprising:
    a switch fabric including a switch fabric classifier, a plurality of external ports and a plurality of internal ports, the switch fabric being configured for switching incoming packets received at the external ports; and
    a control processor configured to execute a network device operation system (ndOS), wherein network devices executing the ndOS are defined to switch layer 2 packets and to share network information with other network devices executing ndOS, wherein the control processor is configured to generate a local topology that identifies which network entities are connected to each of the plurality of external ports, wherein the control processor is configured to share information associated with the local topology with other ndOS network devices that execute the ndOS;
    wherein the control processor is configured to receive one or more remote local topologies from respective one or more ndOS network devices;
    wherein the control processor generates a global topology based on the local topology and the one or more remote local topologies, wherein the global topology is shared by the network device and the ndOS network devices executing ndOS, wherein the global topology identifies which entities are connected to one or more of the ndOS network devices, and
    receive a packet with a destination media access control (MAC) address; determine that the destination MAC address is not in the local topology; and send a discovery packet through a first external port to a second ndOS network device implementing ndOS, the discovery packet including a first device ID of the network device and a port ID of the first external port in the network device.

11. The network device as recited in claim 10, wherein the control processor transmits the local topology to one or more of the ndOS network devices.

12. The network device as recited in claim 10, wherein when the control processor receives, at a first ingress port, a second discovery packet having a sending device ID and an egress port ID, the control processor adds an entry to the local topology, the entry including the network device ID, a first ingress port ID, the sending device ED, and the egress port ID.

13. The network device as recited in claim 10, wherein the control processor updates the local topology based on the received one or more remote local topologies.

14. The network device as recited in claim 10, wherein ndOS network devices are configured to obtain topology information from directly connected and from indirectly connected ndOS network devices.

15. A non-transitory computer-readable storage medium storing a computer program, comprising program instructions which, when executed by a network device, cause the network to:
- generate a local topology that identifies which network entities are connected to each external port of the network device, wherein the network device is configured to execute a network device operation system (ndOS), wherein the network device is configured to share information associated with the local topology with other ndOS network devices that execute the ndOS;
- receive one or more remote local topologies from respective one or more ndOS network devices; and
- generate a global topology based on the local topology and the one or more remote local topologies, wherein the global topology is shared by the network device and the ndOS network devices executing ndOS, wherein the global topology identifies which entities are connected to one or more of the ndOS network devices, and
- receive, a packet with a destination media access control (MAC) address;
- determine, that the destination MAC address is not in the local topology; and
- send, by the network device, a discovery packet through a first external port to a second ndOS network device implementing ndOS, the discovery packet including a first device ID of the network device and a port ID of the first external port in the network device.

16. The storage medium as recited in claim 15, further including program instructions which, when executed by a network device, causes the network to:
- transmit, from the network device, the local topology to one or more of the ndOS network devices.

17. The storage medium as recited in claim 15, further including program instructions which, when executed by a network device, causes the network to:
- receive, at a first ingress port of the network device, a second discovery packet having a sending device ID and an egress port ID; and
- add an entry to the local topology, the entry including the network device ID, a first ingress port ID, the sending device ID, and the egress port ID.

* * * * *